US012532072B2

(12) United States Patent
Olson et al.

(10) Patent No.: US 12,532,072 B2
(45) Date of Patent: Jan. 20, 2026

(54) REAL-TIME FOCUSING IN A SLIDE-SCANNING SYSTEM

(71) Applicant: Leica Biosystems Imaging, Inc., Vista, CA (US)

(72) Inventors: Allen H. Olson, Vista, CA (US); Yunlu Zou, Vista, CA (US); Bharat Annaldas, Vista, CA (US); Leng-Chun Chen, Vista, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 83 days.

(21) Appl. No.: 18/500,231

(22) Filed: Nov. 2, 2023

(65) Prior Publication Data

US 2024/0064400 A1    Feb. 22, 2024

Related U.S. Application Data

(63) Continuation of application No. 17/309,716, filed as application No. PCT/US2020/045074 on Aug. 5, 2020, now Pat. No. 11,863,867.

(Continued)

(51) Int. Cl.
*H04N 23/67*    (2023.01)
*G02B 21/00*    (2006.01)
(Continued)

(52) U.S. Cl.
CPC ........... *H04N 23/67* (2023.01); *G02B 21/002* (2013.01); *G02B 21/244* (2013.01);
(Continued)

(58) Field of Classification Search
CPC ...... H04N 5/23212; H04N 3/06; H04N 5/247; H04N 5/2256; H04N 5/3692;
(Continued)

(56) References Cited

U.S. PATENT DOCUMENTS 11,863,867 B2    1/2024    Olson et al.
2004/0223137 A1*  11/2004   Littau ................. G03F 7/70675
356/123

(Continued)

FOREIGN PATENT DOCUMENTS

CN    100377167 C    3/2008
JP    H10-161013 A    6/1998
(Continued)

OTHER PUBLICATIONS

Anonymous Gaussian Models—MATLAB & Simulink—Mathworks Deutschland, May 6, 2017, Retrieved from the internet <https://web.archive.org/web/20170506161354/http://de.mathworks.com:80/help/curvefit/gaussian.html>, accessed on Nov. 9, 2020. Section 11 Fit Gaussian Models Interactivity 11.

(Continued)

*Primary Examiner* — Shadan E Haghani
(74) *Attorney, Agent, or Firm* — Frost Brown Todd LLP

(57) ABSTRACT

Real-time focusing in a slide-scanning system. In an embodiment, focus points are added to an initialized focus map while acquiring a plurality of image stripes of a sample on a glass slide. For each image stripe, a plurality of frames, collectively representing the image stripe, may be acquired using both an imaging line-scan camera and a tilted focusing line-scan camera. Focus points, representing positions of best focus for trusted frames, are added to the focus map. Outlying focus points are removed from the focus map. In some cases, one or more image stripes may be reacquired. Finally, the image stripes are assembled into a composite image of the sample.

14 Claims, 17 Drawing Sheets

Related U.S. Application Data

(60) Provisional application No. 62/883,525, filed on Aug. 6, 2019.

(51) Int. Cl.
  *G02B 21/24* (2006.01)
  *G02B 21/36* (2006.01)
  *H04N 3/06* (2006.01)
  *H04N 23/90* (2023.01)
  *H04N 23/56* (2023.01)

(52) U.S. Cl.
  CPC ............ *G02B 21/367* (2013.01); *H04N 3/06* (2013.01); *H04N 23/90* (2023.01); *H04N 23/56* (2023.01)

(58) Field of Classification Search
  CPC .. G02B 21/002; G02B 21/244; G02B 21/367; G02B 7/28; G02B 7/38; G02B 21/245; G03B 13/36; G06V 20/693
  See application file for complete search history.

(56) References Cited

U.S. PATENT DOCUMENTS

| | | | |
|---|---|---|---|
| 2007/0069106 A1 | 3/2007 | Krief et al. | |
| 2010/0194971 A1* | 8/2010 | Li | G02B 7/38 348/E5.042 |
| 2014/0184780 A1 | 7/2014 | Abe | |
| 2014/0247379 A1* | 9/2014 | Najmabadi | G01N 21/6458 348/295 |
| 2014/0300724 A1 | 10/2014 | Olson et al. | |
| 2015/0296126 A1* | 10/2015 | Okugawa | G02B 7/36 348/345 |
| 2017/0167948 A1 | 6/2017 | Gouch | |
| 2018/0136451 A1* | 5/2018 | Soenksen | H04N 7/183 |
| 2018/0188517 A1 | 7/2018 | Zou et al. | |
| 2018/0275388 A1 | 9/2018 | Zou et al. | |
| 2019/0101739 A1 | 4/2019 | Chen et al. | |

FOREIGN PATENT DOCUMENTS

| | | |
|---|---|---|
| JP | 2004-514920 A | 5/2004 |
| JP | 2007-264151 A | 10/2007 |
| JP | 2010-091856 A | 4/2010 |
| WO | WO 2012/159651 A1 | 11/2012 |
| WO | WO 2019/068038 A1 | 4/2019 |
| WO | WO 2019/068043 A1 | 4/2019 |

OTHER PUBLICATIONS

Aperio GT 450, screenshot of Google image search results, accessed on Jan. 17, 2019.
Leica Biosystems: "Leica Aperio GT 450 RUO", uploaded Jul. 30, 2019, retrieved from the Internet <https://vimeo.com./350887835>, accessed Sep. 8, 2022.
Zhang, Yupeng, et al. "Autofocus System and Evaluation Methodologies: A Literature Review." *Sensors & Materials* 30 (2018).
International Search Report and Written Opinion dated Nov. 17, 2020, for International Application No. PCT/US2020/045074, 16 pages.
Japanese First Office Action dated Apr. 2, 2024, for Application No. 2021-538317, 5 pages.
Japanese First Office Action dated Sep. 25, 2025, for Application No. 2025-016725, 3 pages.

* cited by examiner

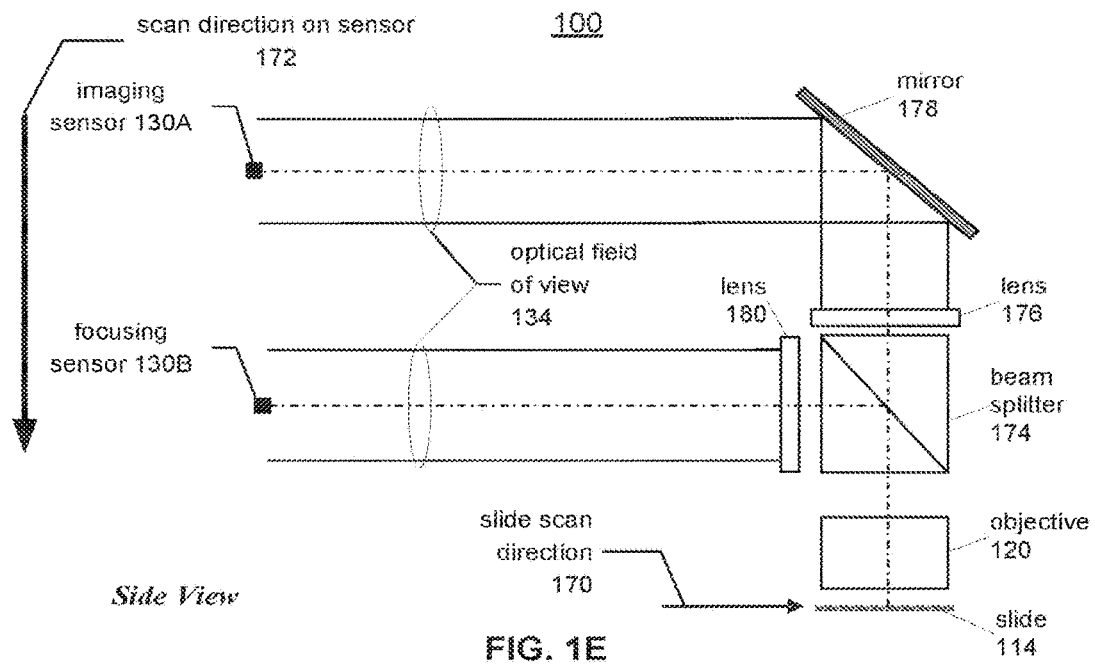
FIG. 1E
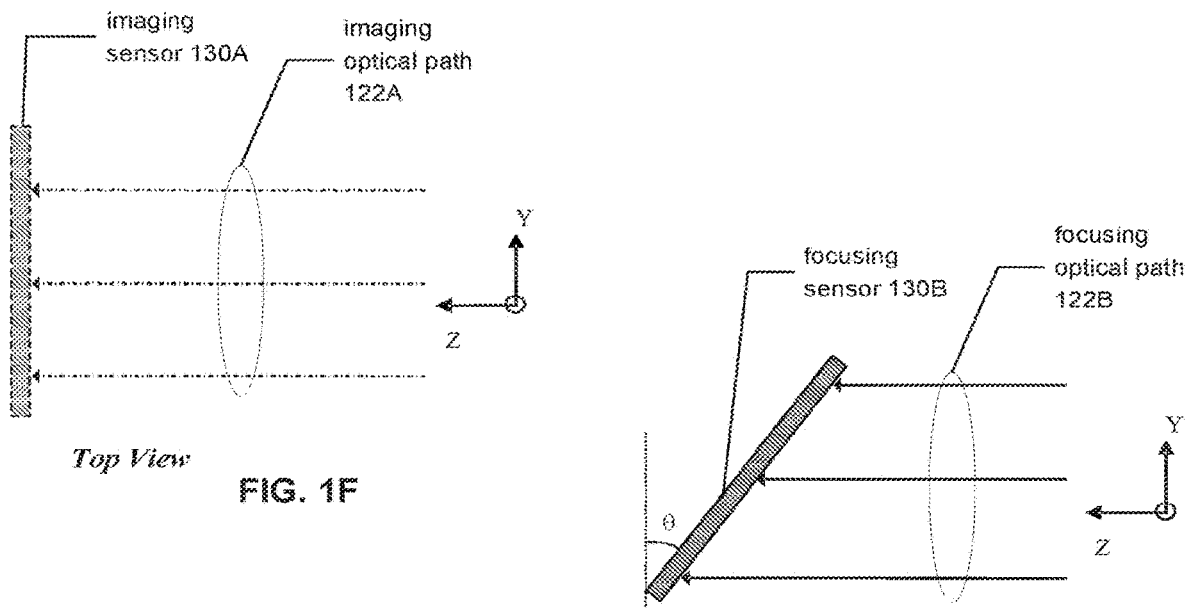
FIG. 1F
FIG. 1G

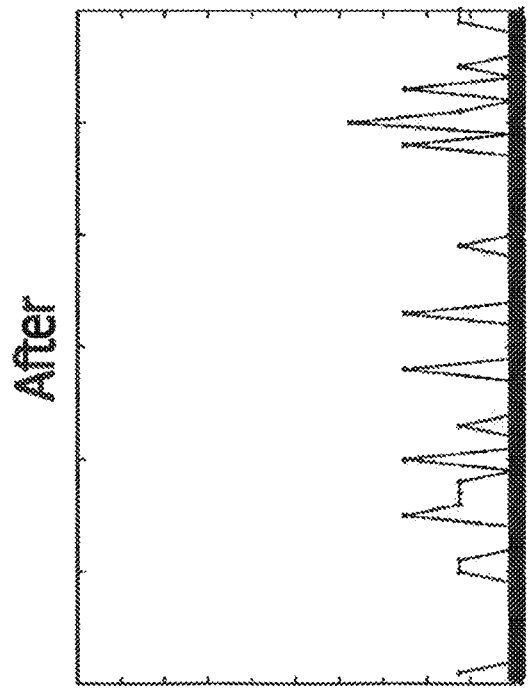
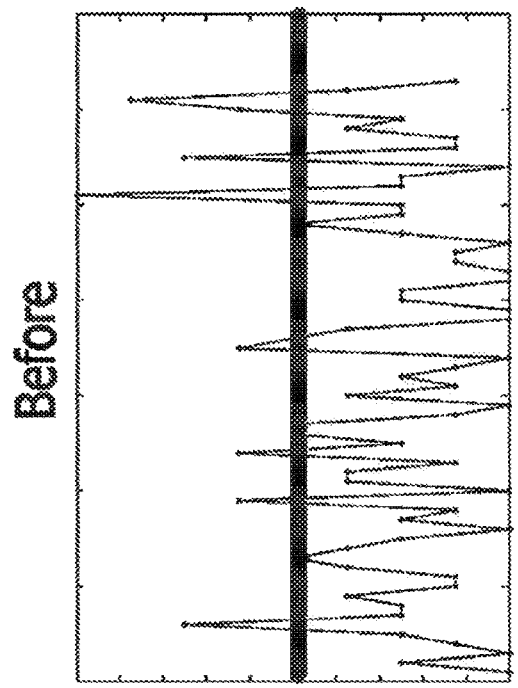
FIG. 2

… (list of related applications continues)

REAL-TIME FOCUSING IN A SLIDE-SCANNING SYSTEM

CROSS-REFERENCE TO RELATED APPLICATIONS

The present application is a continuation of U.S. application Ser. No. 17/309,716, entitled "Real-Time Focusing in a Slide-Scanning System," filed Jun. 16, 2021, which is a National Stage Entry of International Application No. PCT/US2020/045074, entitled "Real-Time Focusing in a Slide-Scanning System," filed Aug. 5, 2020, which claims priority to U.S. Provisional Patent App. No. 62/883,525, filed Aug. 6, 2019, which is hereby incorporated herein by reference as if set forth in full.

In addition, the present application is related to the following applications, which are all hereby incorporated herein by reference as if set forth in full:

- International Patent App. No. PCT/US2016/053581, filed Sep. 23, 2016;
- International Patent App. No. PCT/US2017/028532, filed Apr. 20, 2017;
- International Patent App. No. PCT/US2018/063456, filed Nov. 30, 2018;
- International Patent App. No. PCT/US2018/063460, filed Nov. 30, 2018;
- International Patent App. No. PCT/US2018/063450, filed Nov. 30, 2018;
- International Patent App. No. PCT/US2018/063461, filed Nov. 30, 2018;
- International Patent App. No. PCT/US2018/062659, filed Nov. 27, 2018;
- International Patent App. No. PCT/US2018/063464, filed Nov. 30, 2018;
- International Patent App. No. PCT/US2018/054460, filed Oct. 4, 2018;
- International Patent App. No. PCT/US2018/063465, filed Nov. 30, 2018;
- International Patent App. No. PCT/US2018/054462, filed Oct. 4, 2018;
- International Patent App. No. PCT/US2018/063469, filed Nov. 30, 2018;
- International Patent App. No. PCT/US2018/054464, filed Oct. 4, 2018;
- International Patent App. No. PCT/US2018/046944, filed Aug. 17, 2018;
- International Patent App. No. PCT/US2018/054470, filed Oct. 4, 2018;
- International Patent App. No. PCT/US2018/053632, filed Sep. 28, 2018;
- International Patent App. No. PCT/US2018/053629, filed Sep. 28, 2018;
- International Patent App. No. PCT/US2018/053637, filed Sep. 28, 2018;
- International Patent App. No. PCT/US2018/062905, filed Nov. 28, 2018;
- International Patent App. No. PCT/US2018/063163, filed Nov. 29, 2018;
- International Patent App. No. PCT/US2017/068963, filed Dec. 29, 2017;
- International Patent App. No. PCT/US2019/020411, filed Mar. 1, 2019;
- U.S. patent application Ser. No. 29/631,492, filed Dec. 29, 2017;
- U.S. patent application Ser. No. 29/631,495, filed Dec. 29, 2017;
- U.S. patent application Ser. No. 29/631,499, filed Dec. 29, 2017; and
- U.S. patent application Ser. No. 29/631,501, filed Dec. 29, 2017.

BACKGROUND

Field of the Invention

The embodiments described herein are generally directed to control of a slide-scanning system, and, more particularly, to real-time focusing in a slide-scanning system.

Related Art

Digital pathology is an image-based information environment, which is enabled by computer technology that allows for the management of information generated from a physical slide. Digital pathology is enabled in part by virtual microscopy, which is the practice of scanning a specimen on a physical glass slide, and creating a digital slide image that can be stored, viewed, managed, and analyzed on a computer monitor. With the capability of imaging an entire glass slide, the field of digital pathology has exploded, and is currently regarded as one of the most promising avenues of diagnostic medicine in order to achieve even better, faster, and cheaper diagnosis, prognosis, and prediction of important diseases, such as cancer.

A primary objective for the digital pathology industry is to decrease the scanning time, Decreased scanning time can be achieved by switching over to real-time focusing during actual scanning, To achieve high-quality focused image data using real-time focus during actual scanning, the scanning device must be able to determine the next Z value (e.g., distance between the objective lens and specimen) for the objective lens. Therefore, what is needed is a system and method that overcomes the significant problems in real-time focusing found in conventional systems.

SUMMARY

Systems, methods, and non-transitory computer-readable media are disclosed for real-time focusing in a slide-scanning system.

In an embodiment, a method is disclosed that comprises using at least one hardware processor of a scanning system to: initialize a focus map; add focus points to the focus map while acquiring a plurality of image stripes of at least a portion of a sample on a glass slide, by, for each of the plurality of image stripes, acquiring each of a plurality of frames, collectively representing the image stripe, using both an imaging line-scan camera and a tilted focusing line-scan camera, and adding focus points, representing positions of best focus for trusted ones of the plurality of frames, to the focus map; remove any outlying focus points from the focus map; determine whether or not to restripe one or more of the plurality of image stripes based on a focus error for each of the plurality of frames in the plurality of image stripes; when determining to restripe one or more image stripes; reacquire the one or more image stripes; and assemble the plurality of image stripes into a composite image of the at least a portion of the sample.

Adding focus points to the focus map while acquiring the plurality of image stripes further may comprise, for each of the plurality of image stripes other than a last one of the plurality of image stripes to be acquired, after acquiring the image stripe, determining a direction from the image stripe of a next one of the image stripes to acquire. The plurality of image stripes may be acquired by, in order: acquiring a reference stripe; acquiring image stripes, in sequence, from a first side of the reference stripe to a first edge of a scan area of the sample; and acquiring image stripes; in sequence, from a second side of the reference stripe, which is opposite the first side of the reference stripe, to a second edge of the scan area, which is opposite the first edge of the semi area.

The method may further comprise, prior to starting acquisition of the plurality of image stripes, adding a plurality of macro focus points to the focus map. The method may further comprise, after acquisition of one or more of the plurality of image stripes, adding one or more macro focus points to the focus map.

Adding focus points to the focus map while acquiring the plurality of image stripes further may comprise, for each of the plurality of frames in each of the plurality of image stripes, determining whether or not the frame is trusted. Determining whether or not the frame is trusted may comprise: calculating a main gradient vector comprising an average gradient vector for each column in the frame acquired by the imaging line-scan camera; calculating a tilt gradient vector comprising an average gradient vector for each column in the frame acquired by the tilted focusing line-scan camera; determining a number of analyzable columns in the main gradient vector; calculating a ratio vector based on the main gradient vector and the tilt gradient vector; determining whether or not the frame is analyzable based on the number of analyzable columns and the ratio vector; when determining that the frame is not analyzable, determining that the frame is not trusted; and, when determining that the frame is analyzable, fitting at least one Gaussian function to a ratio curve, represented by the ratio vector, identifying a peak of the Gaussian function as a best focus position, identifying an amplitude of the ratio vector at the best focus position as a fit maximum, determining whether or not the frame is trustable based on the best focus position and the fit maximum, when determining that the frame is not trustable, determining that the frame is not trusted, and, when determining that the frame is trustable, adding the best focus position to the focus map. Determining the number of analyzable columns may comprise determining a number of columns in the main gradient vector that exceed a threshold. Calculating the ratio vector may comprise dividing the tilt gradient vector by the main gradient vector. Determining whether or not the frame is analyzable may comprise: determining whether or not the number of analyzable columns exceeds a predefined threshold percentage; determining whether or not a value of the ratio vector at a parfocal location is within a predefined range, wherein the parfocal location is a point on the tilted focusing line-scan camera that is parfocal with the imaging line-scan camera; when determining that the number of analyzable columns does not exceed the predefined threshold or the value of the ratio vector at the parfocal location is not within the predefined range, determining that the frame is not analyzable, and, when determining that the number of analyzable columns exceeds the predefined threshold percentage and the value of the ratio vector at the parfocal location is within the predefined range, determining that the frame is analyzable. Fitting at least one Gaussian function to the ratio curve may comprise: sampling a plurality of possible Gaussian functions within a range of mean values and a range of sigma values; and selecting one of the plurality of possible Gaussian functions, to be used for identifying the best focus position, with a smallest difference from the ratio curve.

Removing any outlying focus points from the focus map may comprise, for one or more sample points in the focus map: in each of four directions, calculating a slope away from the sample point within the focus map; if a minimum of the calculated slopes exceeds a predefined threshold, removing the sample point from the focus map.

Determining whether or not to restripe one or more of the plurality of image stripes may comprise, after removing any outlying focus points from the focus map: for each of the plurality of frames in each of the plurality of image stripes, calculating the focus error for the frame by subtracting an actual position of an objective lens during acquisition of the frame from a best focus position for that frame within the focus map; for each of the plurality of image stripes, determining to restripe the image stripe when a number of the frames, that have a focus error exceeding a predefined threshold, exceeds a predefined threshold percentage.

The method may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 1E illustrates an example side view configuration of line-scan cameras in a scanning system, according to an embodiment;

FIG. 1F illustrates an example top view configuration of an imaging sensor respect to an imaging optical path, according to an embodiment;

FIG. 1G illustrates an example top view configuration of a focusing sensor, with respect to a focusing optical path, according to an embodiment;

FIG. 2 illustrates example focus error before and after applying offset correction using a calculated macro focus offset, according to an embodiment;

DETAILED DESCRIPTION

In an embodiment, systems, methods, and non-transitory computer-readable media are disclosed for real-time focusing in a slide-scanning system. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Scanning System

Figure 1A:
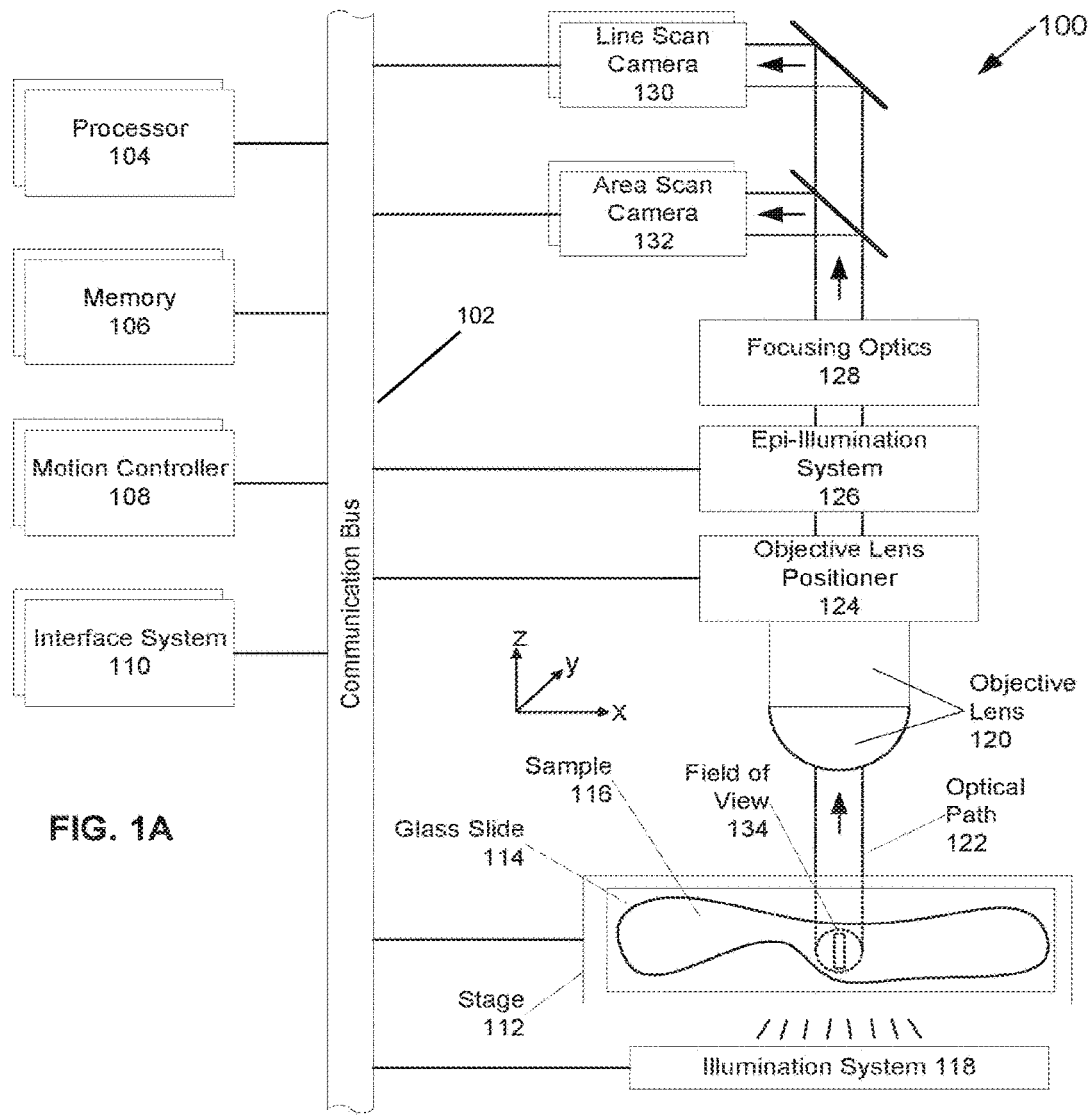
FIG. 1A illustrates an example processor-enabled device that may be used in connection with the various embodiments described herein, according to an embodiment.

FIG. 1A is a block diagram illustrating an example processor-enabled slide-scanning system 100 that may be used in connection with various embodiments described herein. Alternative forms of scanning system 100 may also be used as will be understood by the skilled artisan. In the illustrated embodiment, scanning system 100 is presented as a digital imaging device that comprises one or more processors 104, one or more memories 106, one or more motion controllers 108, one or more interface systems 110, one or more movable stages 112 that each support one or more glass slides 114 with one or more samples 116, one or more illumination systems 118 that illuminate sample 116, one or more objective lenses 120 that each define an optical path 122 that travels along an optical axis, one or more objective lens positioners 124, one or more optional epi-illumination systems 126 (e.g., included in a fluorescence-scanning embodiment), one or more focusing optics 128, one or more line-scan cameras 130, and/or one or more area-scan cameras 132, each of which define a separate field of view 134 on sample 116 and/or glass slide 114. The various elements of scanning system 100 are communicatively coupled via one or more communication busses 102. Although there may be a plurality of each of the various elements of scanning system 100, for simplicity in the description that follows, these elements will be described in the singular, except when needed to be described in the plural to convey the appropriate information.

Processor 104 may include, for example, a central processing unit (CPU) and a separate graphics processing unit (GPU) capable of processing instructions in parallel, or a multicore processor capable of processing instructions in parallel. Additional separate processors may also be provided to control particular components or perform particular functions, such as image processing. For example, additional processors may include an auxiliary processor to manage data input, an auxiliary processor to perform floating-point mathematical operations, a special-purpose processor having an architecture suitable for fast execution of signal-processing algorithms (e.g., digital-signal processor), a slave processor subordinate to the main processor (e.g., back-end processor), an additional processor for controlling line-scan camera 130, stage 112, objective lens 120, and/or a display (e.g., a console comprising a touch panel display integral to scanning system 100). Such additional processors may be separate discrete processors or may be integrated into a single processor.

Memory 106 provides storage of data and instructions for programs that can be executed by processor 104. Memory 106 may include one or more volatile and/or non-volatile computer-readable storage mediums that store the data and instructions. These mediums may include, for example, random-access memory (RAM), read-only memory (ROM), a hard disk drive, a removable storage drive (e.g., comprising flash memory), and/or the like. Processor 104 is configured to execute instructions that are stored in memory 106, and communicate via communication bus 102 with the various elements of scanning system 100 to carry out the overall function of scanning system 100.

Communication bus 102 may be configured to convey analog electrical signals and/or digital data. Accordingly, communications from processor 104, motion controller 108, and/or interface system 110, via communication bus 102, may include both electrical signals and digital data. Processor 104, motion controller 108, and/or interface system 110 may also be configured to communicate with one or more of the various elements of scanning system 100 via a wireless communication link.

Motion control system 108 is configured to precisely control and coordinate X, Y, and/or Z movement of stage 112 (e.g., within an X-Y plane), X, Y, and/or Z movement of objective lens 120 (e.g., along a Z axis orthogonal to the X-Y plane, via objective lens positioner 124), rotational movement of a carousel described elsewhere herein, lateral movement of a push/pull assembly described elsewhere herein, and/or any other moving component of scanning system 100. For example, in a fluorescence-scanning embodiment comprising epi-illumination system 126, motion control system 108 may be configured to coordinate movement of optical filters and/or the like in epi-illumination system 126.

Interface system 110 allows scanning system 100 to interface with other systems and human operators. For example, interface system 110 may include a console (e.g., a touch panel display) to provide information directly to an operator via a graphical user interface and/or allow direct input from an operator via a touch sensor. Interface system 110 may also be configured to facilitate communication and data transfer between scanning system 100 and one or more external devices that are directly connected to scanning system 100 (e.g., a printer, removable storage medium, etc.), and/or one or more external devices that are indirectly connected to scanning system 100, for example, via one or more networks (e.g., an image storage system, a Scanner Administration Manager (SAM server and/or other administrative server, an operator station, a user station, etc.).

Illumination system 118 is configured to illuminate at least a portion of sample 116, Illumination system 118 may include, for example, one or more light sources and illumination optics. The light source(s) could comprise a variable intensity halogen light source with a concave reflective mirror to maximize light output and a KG-1 filter to suppress heat. The light source(s) could comprise any type of arc-lamp, laser, or other source of light. In an embodiment, illumination system 118 illuminates sample 116 in transmission mode, such that line-scan camera 130 and/or area-scan camera 132 sense optical energy that is transmitted through sample 116. Alternatively or additionally, illumination system 118 may be configured to illuminate sample 116 in reflection mode, such that line-scan camera 130 and/or area-scan camera 132 sense optical energy that is reflected from sample 116. Illumination system 118 may be configured to be suitable for interrogation of sample 116 in any known mode of optical microscopy.

In an embodiment, scanning system 100 includes an epi-illumination system 126 to optimize scanning system 100 for fluorescence scanning. It should be understood that, if fluorescence scanning is not supported by scanning system 100, epi-illumination system 126 may be omitted. Fluorescence scanning is the scanning of samples 116 that include fluorescence molecules, which are photon-sensitive molecules that can absorb light at a specific wavelength (i.e., excitation). These photon-sensitive molecules also emit light at a higher wavelength (i.e., emission). Because the efficiency of this photoluminescence phenomenon is very low, the amount of emitted light is often very low. This low amount of emitted light typically frustrates conventional techniques for scanning and digitizing sample 116 (e.g., transmission-mode microscopy).

Advantageously, in an embodiment of scanning system 100 that utilizes fluorescence scanning, use of a line-scan camera 130 that includes multiple linear sensor arrays (e.g., a time-delay-integration (TDI) line-scan camera) increases the sensitivity to light of line-scan camera 130 by exposing the same area of sample 116 to each of the plurality of linear sensor arrays of line-scan camera 130. This is particularly useful when scanning faint fluorescence samples with low levels of emitted light. Accordingly, in a fluorescence-scanning embodiment, line-scan camera 130 is preferably a monochrome TDI line-scan camera. Monochrome images are ideal in fluorescence microscopy because they provide a more accurate representation of the actual signals from the various channels present on sample 116. As will be understood by those skilled in the art, a fluorescence sample can be labeled with multiple florescence dyes that emit light at different wavelengths, which are also referred to as "channels."

Furthermore, because the low-end and high-end signal levels of various fluorescence samples present a wide spectrum of wavelengths for line-scan camera 130 to sense, it is desirable for the low-end and high-end signal levels that line-scan camera 130 can sense to be similarly wide. Accordingly, in a fluorescence-scanning embodiment, line-scan camera 130 may comprise a monochrome 10-bit 64-linear-array TDI line-scan camera. It should be rioted that a variety of bit depths for line-scan camera 130 can be employed for use with such an embodiment.

Movable stage 112 is configured for precise X-Y movement under control of processor 104 or motion controller 108. Movable stage 112 may also be configured for Z movement under control of processor 104 or motion controller 108. Movable stage 112 is configured to position sample 116 in a desired location during image data capture by line-scan camera 130 and/or area-scan camera 132. Movable stage 112 is also configured to accelerate sample 116 in a, scanning direction to a substantially constant velocity, and then maintain the substantially constant velocity during image data capture by line-scan camera 130. In an embodiment, scanning system 100 may employ a high-precision and tightly coordinated X-Y grid to aid in the location of sample 116 on movable stage 112. In an embodiment, movable stage 112 is a linear-motor-based X-Y stage with high-precision encoders employed on both the X and the Y axes. For example, very precise nanometer encoders can be used on the axis in the scanning direction and on the axis that is in the direction perpendicular to the scanning direction and on the same plane as the scanning direction. Stage 112 is also configured to support glass slide 114 upon which sample 116 is disposed.

Sample 116 can be anything that may be interrogated by optical microscopy. For example, glass microscope slide 114 is frequently used as a viewing substrate for specimens that include tissues and cells, chromosomes, deoxyribonucleic acid (DNA), protein, blood, bone marrow, urine, bacteria, beads, biopsy materials, or any other type of biological material or substance that is either dead or alive, stained or unstained, labeled or unlabeled. Sample 116 may also be an array of any type of DNA or DNA-related material, such as complementary DNA (cDNA) or ribonucleic acid (RNA), or protein that is deposited on any type of slide or other substrate, including any and all samples commonly known as microarrays. Sample 116 may be a microtiter plate (e.g., a 96-well plate). Other examples of sample 116 include integrated circuit boards, electrophoresis records, petri dishes, film, semiconductor materials, forensic materials, and machined parts.

Objective lens 120 is mounted on objective positioner 124, which, in an embodiment, employs a very precise linear motor to move objective lens 120 along the optical axis defined by objective lens 120. For example, the linear motor of objective lens positioner 124 may include a fifty-nanometer encoder. The relative positions of stage 112 and objective lens 120 in X, Y, and/or Z axes are coordinated and controlled in a closed-loop manner using motion controller 108 under the control of processor 104 that employs memory 106 for storing information and instructions, including the computer-executable programmed steps for overall operation of scanning system 100.

In an embodiment, objective lens 120 is a plan apochromatic ("APO") infinity-corrected objective lens which is suitable for transmission-mode illumination microscopy, reflection-mode illumination microscopy, and/or epi-illumination-mode fluorescence microscopy (e.g., an Olympus 40×, 0.75NA or 20×, 0.75 NA). Advantageously, objective lens 120 is capable of correcting for chromatic and spherical aberrations. Because objective lens 120 is infinity-corrected, focusing optics 128 can be placed in optical path 122 above objective lens 120 where the light beam passing through objective lens 120 becomes a collimated light beam, Focusing optics 128 focus the optical signal captured by objective lens 120 onto the light-responsive elements of line-scan camera 130 and/or area-scan camera 132, and may include optical components such as filters, magnification changer lenses, and/or the like. Objective lens 120, combined with focusing optics 128, provides the total magnification for scanning system 100. In an embodiment, focusing optics 128 may contain a tube lens and an optional 2× magnification changer. Advantageously, the 2× magnification changer allows a native 20× objective lens 120 to scan sample 116 at 40× magnification.

Line-scan camera 130 comprises at least one linear array of picture elements 142 ("pixels"). Line-scan camera 130 may be monochrome or color. Color line-scan cameras typically have at least three linear arrays, while monochrome line-scan cameras may have a single linear array or plural linear arrays. Any type of singular or plural linear array, whether packaged as part of a camera or custom-integrated into an imaging electronic module, can also be used. For example, a three linear array ("red-green-blue" or "RCB") color line-scan camera or a ninety-six linear array monochrome TDI may also be used. TDI line-scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line-scan cameras comprise multiple linear arrays. For example, TDI line-scan cameras are available with 24, 32, 48, 64, 96, or even more linear arrays. Scanning system 100 also supports linear arrays that are manufactured in a variety of formats including some with 512 pixels, some with 1,024 pixels, and others having as many as 4,096 pixels. Similarly, linear arrays with a variety of pixel sizes can also be used in scanning system 100. The salient requirement for the selection of any type of line-scan camera 130 is that the motion of stage 112 can be synchronized with the line rate of line-scan camera 130, so that stage 112 can be in motion with respect to line-scan camera 130 during the digital image capture of sample 116.

In an embodiment, the image data generated by line-scan camera 130 is stored in a portion of memory 106 and processed by processor 104 to generate a contiguous digital image of at least a portion of sample 116. The contiguous digital image can be further processed by processor 104, and the processed contiguous digital image can also be stored in memory 106.

In an embodiment with two or more line-scan cameras 130, at least one of the line-scan cameras 130 can be configured to function as a focusing sensor that operates in combination with at least one of the other line-scan cameras 130 that is configured to function as an imaging sensor 130A. The focusing sensor can be logically positioned on the same optical axis as the imaging sensor 130A or the focusing sensor may be logically positioned before or after the imaging sensor 130A with respect to the scanning direction of scanning system 100. In such an embodiment with at least one line-scan camera 130 functioning as a focusing sensor, the image data generated by the focusing sensor may be stored in a portion of memory 106 and processed by processor 104 to generate focus information, to allow scanning system 100 to adjust the relative distance between sample 116 and objective lens 120 to maintain focus on sample 116 during scanning. Additionally, in an embodiment, the at least one line-scan camera 130 functioning as a focusing sensor may be oriented such that each of a plurality of individual pixels 142 of the focusing sensor is positioned at a different logical height along the optical path 122.

In operation, the various components of scanning system 100 and the programmed modules stored in memory 106 enable automatic scanning and digitizing of sample 116, which is disposed on glass slide 114. Glass slide 114 is securely placed on movable stage 112 of scanning system 100 for scanning sample 116. Under control of processor 104, movable stage 112 accelerates sample 116 to a substantially constant velocity for sensing by line-scan camera 130, where the speed of stage 112 is synchronized with the line rate of line-scan camera 130. After scanning a stripe of image data, movable stage 112 decelerates and brings sample 116 to a substantially complete stop. Movable stage 112 then moves orthogonal to the scanning direction to position sample 116 for scanning of a subsequent stripe of image data(e.g., adjacent stripe). Additional stripes are subsequently scanned until an entire portion of sample 116 or the entire sample 116 is scanned.

For example, during digital scanning of sample 116, a contiguous digital image of sample 116 is acquired as a plurality of contiguous fields of view that are combined together to form an image stripe. A plurality of adjacent image stripes is similarly combined together to form a contiguous digital image of a portion or the entire sample 116. The scanning of sample 116 may include acquiring vertical image stripes or horizontal image stripes. The scanning of sample 116 may be either top-to-bottom, bottom-to-top, or both (i.e., bi-directional), and may start at any point on sample 116. Alternatively, the scanning of sample 116 may be either left-to-right, right-to-left, or both (i.e., bi-directional), and may start at any point on sample 116. It is not necessary that image stripes be acquired in an adjacent or contiguous manner. Furthermore, the resulting image of sample 116 may be an image of the entire sample 116 or only a portion of the sample 116.

In an embodiment, computer-executable instructions (e.g., programmed modules and software) are stored in memory 106 and, when executed, enable scanning system 100 to perform the various functions (e.g., display the graphical user interface, execute the disclosed processes, control the components of scanning system 100, etc.) described herein. In this description, the term "computer-readable storage medium" is used to refer to any media used to store and provide computer-executable instructions to scanning system 100 for execution by processor 104. Examples of these media include memory 106 and any removable or external storage medium (not shown) communicatively coupled with scanning system 100 either directly (e.g., via a universal serial bus (USB), a wireless communication protocol, etc.) indirectly (e.g., via a wired and/or wireless network).

Figure 1B:
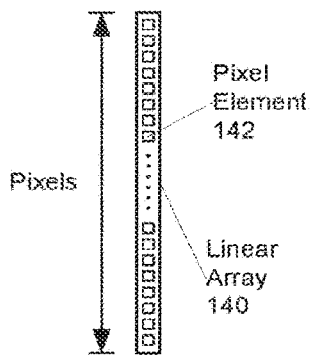
FIG. 1B illustrates an example line-scan camera having a single linear array, according to an embodiment.

FIG. 1B illustrates a line-scan camera 130 having a single linear array 140, which may be implemented as a charge-coupled device ("CCD") array. Single linear array 140 comprises a plurality of individual pixels 142. In the illustrated embodiment, the single linear array 140 has 4,096 pixels 142. In alternative embodiments, linear array 140 may have more or fewer pixels. For example, common formats of linear arrays include 512, 1,024, and 4,096 pixels. Pixels 142 are arranged in a linear fashion to define a field of view 134 for linear array 140. The size of field of view 134 varies in accordance with the magnification of scanning system 100.

Figure 1C:
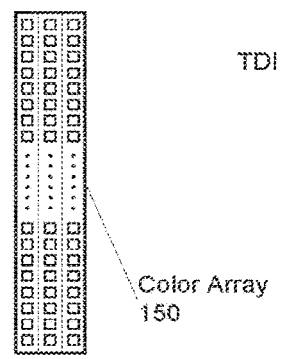
FIG. 1C illustrates an example line-scan camera having three linear arrays, according to an embodiment.

FIG. 1C illustrates a line-scan camera 130 having three linear arrays 140, each of which may be implemented as a CCD array. The three linear arrays 140 combine to form a color array ISO. In an embodiment, each individual linear array in color array 150 detects a different color intensity, including, for example, red, green, or blue. The color image data from each individual linear array 140 in color array 150 is combined to form a single field of view 134 of color image data.

Figure 1D:
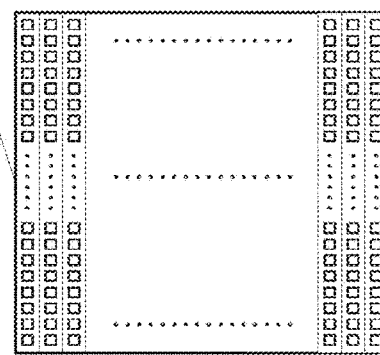
FIG. 1D illustrates an example line-scan camera having a plurality of linear arrays, according to an embodiment.

FIG. 1D illustrates a line-scan camera 130 having a plurality of linear arrays 140, each of which may be implemented as a CCD array. The plurality of linear arrays 140 combine to form a TDI array 160. Advantageously, a TDI line-scan camera may provide a substantially better SNR in its output signal by summing intensity data from previously imaged regions of a specimen, yielding an increase in the SNR that is in proportion to the square-root of the number of linear arrays 140 (also referred to as integration stages).

A TDI line-scan camera may comprise a larger variety of numbers of linear arrays 140. For example, common formats of TDI line-scan cameras include 24, 32, 48, 64, 96, 120, and even more linear arrays 140.

FIG. 1E illustrates an example side view configuration of line-scan cameras 130 in scanning system 100, according to an embodiment. In the illustrated embodiment, scanning system 100 comprises a glass slide 114, with a tissue sample 116 that is placed on motorized stage 112, illuminated by illumination system 118, and moved in a scanning direction 170. Objective lens 120 has an optical field of view 134 that is trained on slide 114 and provides an optical path 122 for light from illumination system 118 that passes through sample 116 on slide 114, reflects off of sample 116 on slide 114, fluoresces from sample 116 on slide 114, or otherwise passes through objective lens 120. The light travels on optical path 122 to a beam splitter 174 that allows some of the light to pass through lens 176 to main imaging sensor 130A. The light may optionally be beat by a mirror 178 as shown in the illustrated embodiment. Imaging sensor 130A may be, for example, a line charge-coupled device (CCD).

Other light travels from beam splitter 174 through lens 180 to a focusing sensor 130B. Focusing sensor 130B may also be, for example, a line CCD, The light that travels to imaging sensor 130A and focusing sensor 130B preferably represents the complete optical field of view 134 from objective lens 120. Based on this configuration of scanning system 100, scanning direction 170 of slide 114 is logically oriented with respect to imaging sensor 130A and focusing sensor 130B, such that the logical scanning direction 172 causes optical field of view 134 of objective lens 120 to pass over the respective imaging sensor 130A and focusing sensor 130B.

FIG. 1F illustrates an example top view of the configuration of imaging sensor 130A with respect to an imaging optical path 122A, according to an embodiment. Similarly, FIG. 1G illustrates an example top view of the configuration of focusing sensor 130B, with respect to a focusing optical path 122B, according to an embodiment. As can be seen in FIG. 1G, focusing sensor 130B is tilted at an angle θ with respect to a direction that is perpendicular to focusing optical path 122B.

Figure 1H:
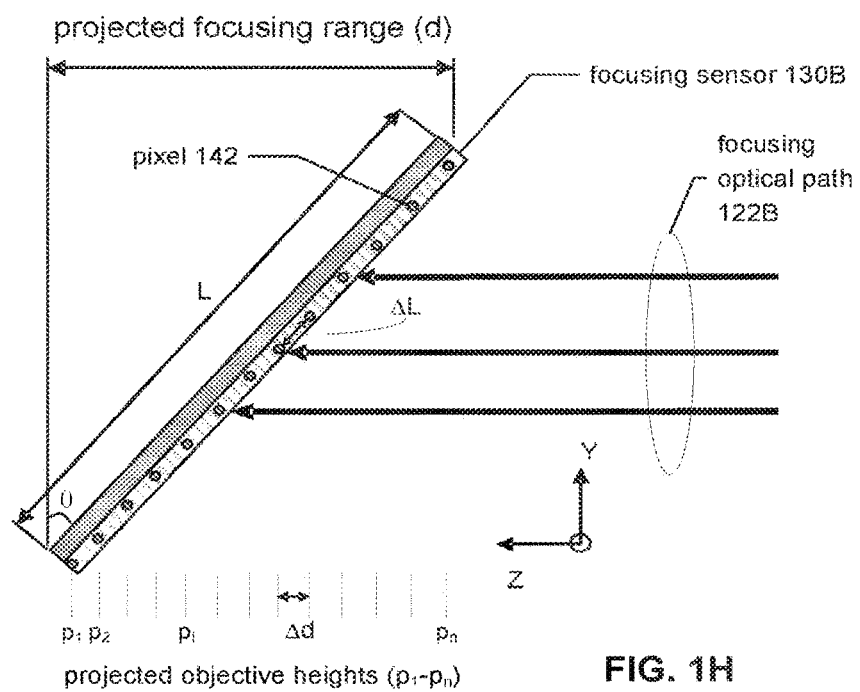
FIG. 1H illustrates an example focusing sensor, according to an embodiment.

FIG. 1H illustrates an example focusing sensor 130B, according to an embodiment. In the illustrated embodiment, within a range of focusing (d) (e.g., 20 μm) on a tissue sample, focusing sensor 130B comprises a plurality of sensor pixels 142 and may be positioned at a location where the entire focusing range (d) in the Z axis is transferred by optics to the entire focusing sensor 130B array in the Y axis (orthogonal to the X axis, i.e., scan direction 170), as shown. The location of each sensor pixel 142 is directly correlated to a Z position of objective tens 120. As illustrated in FIG. 1H, each dashed line (i.e., $p_1, p_2, \ldots p_i, \ldots p_n$) across projected focusing range (d) represents a different focus value and corresponds to a focus height (i.e., Z height) of objective lens 120. The $p_i$ having the optimal focus (e.g., highest contrast metric) for a given portion of sample 116 can be used by scanning system 100 to determine the optimal focus height for that portion of sample 116.

The relationship between the projected focusing range (d) on focusing sensor 1308 and the focusing range (z) on sample 116 is as follows:

$$d = z \cdot M_{focusing}^2,$$

wherein $M_{focusing}$ is the optical magnification of the focusing path. For instance, if z=20 μm and $M_{focusing}$=20, then d=8 mm.

In order to cover the entire projected focusing range (d) by a tilted focusing sensor 130B that comprises a linear array 140, the tilting angle θ should follow the relationship:

$$\sin \theta = d/L$$

wherein L is the length of linear array 140 of focusing sensor 130B. Using d=8 mm and L 20.48 mm, θ=23,0°. θ and L can vary as long as tilted focusing sensor 1308 covers the entire focusing range (d).

The focusing resolution, or the minimum step of objective height motion Δz, is a function of the size of sensor pixel 142, e=minimum(ΔL). Derived from the above formulas:

$$\Delta z = e \cdot z/L.$$

For instance, if e=10 μm, L=20.48 min, and z=2.0 μm, then Δz=0,0097 mm<1.0 nm.

The relationship between the objective height $Z_i$ and the focus location $L_i$ on focusing sensor 130B of focus point i is:

$$L_i = \cdot M_{focusing}^2 / \sin \theta$$

If the focus height is determined by a mean from $L_1$ to $L_2$ according to analysis of the data from focusing sensor 1308, the height of objective lens 120 needs to be moved from $Z_1$ to $Z_2$ based on:

$$Z_2 = Z_1 + \sin 0/M_{focusing}$$

Although the field of view (FOV) 134 in the Y axis of focusing sensor 1308 and imaging sensor 130A can be different, the centers of both sensors 130A and 130B are preferably aligned to each other along the Y axis.

2. Process Overview

Embodiments of processes for real-nine focusing in a slide-scanning system will now be described in detail. It should be understood that the described processes may be embodied in one or more software modules that are executed by one or more hardware processors 104 within scanning system 100. The described processes may be implemented as instructions represented in source code, object code, and/or machine code. These instructions may be executed directly by the hardware processor(s), or alternatively, may be executed by a virtual machine operating between the object code and the hardware processors.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of steps, each process may be implemented with fewer, more, or different steps and a different arrangement and/or ordering of steps. In addition, it should be understood that any step, which does not depend on the completion of another step, may be executed before, after, or in parallel with that other independent step, even if the steps are described or illustrated in a particular order.

In an embodiment, scanning system 100 uses a focus map to predict the trajectory of objective lens 120 during scanning of each image stripe. Focus values for the focus map may be measured using two methods: (1) a macro focus point (MFP) method; and (2) a real-time focus (RTF) method. Focus values for the MFP method are calculated before scanning and/or between acquisitions of image stripes, whereas focus values for the RTF method are calculated during acquisition of image stripes. Both methods may be used in combination to populate the focus map that is used to predict a focal position of objective lens 120 during scanning. Advantageously, the RTF method provides many more focus values for the focus map, than the MFP method alone, but adds little to no time to the scanning process.

The RTF method also provides real-time measurements of focus error. These focus error measurements may be analyzed during scanning of a sample 116, to modify the trajectory of objective lens 120, as an image stripe is scanned. This minimizes the focus error in the predicted focus heights from the focus map.

2.1. MFP Method

In an embodiment, the MFP method comprises using line-scan camera 130 to capture image data along the entire Z axis (e.g., by moving objective lens 120) while stage 112 is moving at constant velocity. Then, the image row having maximum contrast within the image data is identified, and a timing formula is used to calculate the corresponding encoder count (e.g., for objective lens 120) for that row. A minimum contrast threshold, representing a noise threshold, may be used to ensure that the focus is above the noise threshold. Historically, this minimum contrast threshold has been approximately 350.

Historically, the MIT method needs a macro focus offset to provide good image quality. Thus, in an embodiment, a macro focus offset is calculated, by testing the focus value in a closed-loop measurement, to ensure that the MFP method performs accurately. By design, the macro focus offset should be zero. However, in practice, there is a systematic error in the Z position of objective lens 120, as calculated from a prescribed formula and Z-stage tuning.

The macro focus offset may be determined experimentally by macro focusing at a location on tissue and recording the contrast curve and the encoder count of maximum contrast. Objective lens 120 may then be moved (i.e., in the Z axis) to the recorded encoder count, and a second buffer of image data may be recorded, along with the corresponding average contrast value. The average contrast value can be compared to the recorded contrast curve, and the distance of the average contrast value from the recorded maximum contrast value may be measured to provide the Z offset, to be used as the macro focus offset.

FIG. 2 illustrates example focus error before and after applying offset correction using the calculated macro focus offset, according to an embodiment. As illustrated, the mean error was reduced from 0.6 to 0.0 microns, and the maximum error was reduced from 1.0 to 0.4 microns. The impact on image quality was a reduction in the restripe rate (i.e., the rate at which image stripes must be reacquired due to poor focus). This offset correction is important because it allows the addition of focus points when and where they are needed, and also provides the ground truth for assessing the MT; method.

In an embodiment, the MFP parameters are defined as follows, with example nominal values shown, and may be stored in a configuration file (e.g., a "scanner.xml" file defined using eXtensible Markup Language (XML)) used by scanning system 100 for configuration:

Good_Focus_Threshold=350. If the maximum contrast value for a macro focus point is less than this threshold value, then the focus attempt for that macro focus point will be considered unsuccessful and the value for that macro focus point will be discarded.

Retry_Count=1. This is the number of times to try to refocus when a focus attempt fails, due to the maximum contrast value for a macro focus point being less than the value of Good Focus Threshold.

Macrofocus_Pos_Offset=+0.0006. This is the calculated macro focus offset value, due to error in the Z-motion of objective lens 120, in millimeters.

2.2. RTF Method

In an embodiment, the RTF method utilizes two line-scan cameras 130: main imaging sensor 130A (e.g., tri-linear RGB camera); and a single-channel focusing sensor 130B (e.g., monochromatic camera). Both line-scan cameras 130 are aligned so that their linear arrays 140 image the same portion of sample 116 (e.g., which may comprise tissue). For example, main imaging sensor 130A may be parallel to the plane of sample 116, and function in the same way as the tri-linear cameras used in the Aperio ScanScope® products. Focusing sensor 130B, on the other hand, may be tilted in the optical Z-axis, along the linear array 140 of focusing sensor 130B (e.g., perpendicular to scan direction 170), 2.2.1. Design Line-scan cameras 130A and 130B may be aligned with each other, such that the point of maximum contrast for tilted focusing sensor 130B is near the center of the tilted linear array 140 when main imaging sensor 130A is at best focus. The pixel 142 at this point in the tilted linear array 140 of focusing sensor 130B is referred to as the parfocal location. As objective lens 120 moves up and down, relative to the best focus position, the maximum contrast point on tilted focusing sensor 130B moves to the right and left, respectively, of the parfocal location. This allows tilted focusing sensor 130S to be used to dynamically determine the direction and amount of focus error in main imaging sensor 130A, The measured focus error may be used to adjust the position of objective lens 120 in real time, so that main imaging sensor 130A is always in focus.

One or more, and preferably all, of the following issues may be addressed in an embodiment of the RTF method:

Changes in Tissue Contrast across Linear Array. In an embodiment, tilted focusing sensor 130B is not used alone to determine the best focus position, since contrast changes also arise from the change in tissue features across linear array 140. Data from focusing sensor 130B and main imaging sensor 130A may be combined to remove the tissue effect using a ratio method. The ratio method divides the contrast function of tilted focusing sensor 130B by the contrast function of main imaging sensor 130A. This normalized function will peak at the best focus position and remove tissue-dependent effects.

Noise and Camera Alignment Error. In an embodiment, linear arrays 140 are 1×4,096 pixels, with a nominal image pixel dimension of 0.25 microns. At this level of precision, it is not possible to exactly align main imaging sensor 130A and tilted focusing sensor 130B. In addition, the magnification changes slightly across tilted focusing sensor 130B due to its tilt with respect to the optical axis. The contrast values of individual pixels 142 are also noisy, since they are calculated by differencing, the values between neighboring pixels 142. Spatial averaging may be used to reduce these effects. For example, in an embodiment, the outputs of each line scan camera 130 are grouped into consecutive frames when scanning an image stripe. A frame is 1,000 lines by 4,096 pixels. After calculating the pixel contrast values for a frame, the lines are averaged together into a single line. A boxcar filter (e.g., 100 pixels wide) is then applied across this single line. These operations are performed for the frames of both main imaging sensor 130A and tilted focusing sensor 130B. These two averaging operations greatly reduce the effects of noise and alignment error in the ratio method.

Parfocal Location. The value of the parfocal location may be known and calibrated separately. Error in the parfocal location will cause the RTF method to drive to a position which is not the best focus. A method for calculating the parfocal location is described elsewhere herein.

Skipped Frames. In an embodiment, every other frame is a "skipped" frame, since data for these frames are not analyzed for focus error. During the acquisition of a skipped frame, data for the previous frame is analyzed, and objective lens 120 is moved to the best focus position for the next non-skipped frame. In other words, objective lens 120 only moves during the acquisition of the skipped frames and is stationary during acquisition of non-skipped frames. Under normal operation, the frame lag will be one frame, which means that the current frame under objective lens 120 (CFUO) is the frame following the frame which is being analyzed.

Over-Framing. Over-framing is a term used for the case in which frame lag is greater than one frame. In an embodiment, since the scan of an image stripe proceeds at constant velocity, a software timer is implemented, which allows the CFUO to be calculated. The RTF method checks the CFUO when determining the next best focus position. Normally, the CFUO will be the skipped frame, following the frame being analyzed. If this is not the case, then the RTF method will predict the best focus position for the first non-skipped frame following the CFUO, and instruct objective lens 120 to move to that position. Using this strategy, objective lens 120 is always moved to the best position for the current actual location. The RIF method will operate properly provided that the frame lag is not too large. A configuration parameter, Frame_Tag_Stripe_Abort_Threshold, may be provided which will cause the scanning of the image stripe to be aborted and rescanned if the frame lag becomes too large (i.e., exceeds the value of the Frame_Lag_Stripe_Abort_Threshold parameter), Fitting the Ratio Curve. Time ratio method produces a curve which peaks at the best focus position. In an embodiment, a Gaussian function is fitted to the ratio curve, and the peak of the Gaussian function is identified as the best focus position. The goodness of the fit of the Gaussian function may be assessed using a set of metrics to qualify the focus estimate as trustable. Only trustable focus values are added to the focus map.

Focus on Tissue Only. The points added to the focus map should correspond to actual tissue locations in the image data. In prior designs, a probable tissue map was calculated from the macro image using a tissue-finding algorithm, and MFP values were only added to locations of probable tissue. However, a variety of artifacts on glass slide 114 (e.g., cover slip edges, plus marks, debris on the top of the cover slip, etc.) could undesirably result in focus outside of the plane of the tissue. In an embodiment, the probable tissue map from a tissue-finding algorithm may be input to the RTF method, and optionally used to constrain the allowable locations for focus points used by the RTF method. The RTF method may also analyze each frame to determine if tissue is present, and only allow focus points on frames in which tissue is present.

Gaps in Tissue. For reliable estimation of focus error, tissue of sufficient contrast must be available across linear array 140. In an embodiment, the contrast vector for main imaging sensor 130A is used, to determine if a sufficient signal is available to calculate the focus error. The implementation details of this are described elsewhere herein.

Adding MET Values. The RTF method will not always return a trustable focus value for each tissue frame. This can result from insufficient tissue in a frame, as well as from the result being classified as not trustable by the Gaussian fitting process. In an embodiment, after scanning an image stripe, the tissue frames are considered in sequence, and frames which exceed a prescribed distance (e.g., stored as a value in an Rmin parameter) from the nearest trustable focus value are identified for focus by the MFP method. These points may be focused and added to the focus map before scanning the next image stripe.

Rejecting Outliers. In an embodiment, the focus map is inspected after all image stripes have been scanned, to determine if any of the focus points in the focus map are outliers. Outliers may be removed, as discussed elsewhere herein, before assessing scan quality.

Rescanning of Image Stripes. In an embodiment, after all image stripes have been scanned and the focus map is complete, the actual focus location for each tissue frame is compared with the best focus position from the focus map, as described in the restriping process discussed elsewhere herein. Image stripes for which 5% of the frames have a focus error that exceeds a prescribed threshold may be rescanned to produce the final focus map.

Initializing the Scan. In an embodiment, the focus map for scanning is initialized. A tissue-finding algorithm may identify a reference stripe and three or more MFP values to begin the scan. The image stripe with the most tissue may be selected as the reference stripe. An MIT focus point may be measured at the beginning of the reference stripe and at two or more other locations, selected to provide a good span of tissue. Then, the reference stripe is scanned first, using the starting MFP focus value for the stripe and updating the focus position using the RTF method. Scanning of the reference stripe will typically yield many focus values, which are added to the focus map, along with the initial MFP focus values.

Scan Order. In an embodiment, after initializing the focus map, the reference stripe is rescanned. Scanning then proceeds either to the right or left of the reference stripe until that side of the scan area is completed. Scanning then proceeds from the other side of the reference stripe to the opposite edge of the scan area. This order is chosen so that the image stripe being scanned is as close as possible to focus values in the focus map, in order to maximize the likelihood of obtaining acceptable focus on the first pass.

2.2.2. Parfocal Location

In an embodiment, to determine the parfocal location, a vertical Ronchi slide is imaged by both the main imaging sensor 130A and the tilted focusing sensor 130B simultaneously, by sweeping through the Z-range of objective lens 120 at constant velocity. In this manner a pair of buffers of image data are acquired for sensors 130A and 130B.

For main imaging sensor 130A, an average contrast value is calculated for each row of the buffer, and the row of maximum contrast is taken as the best focus index. An additional check may be added to qualify the buffer pair, based upon tilt in the contrast of the image data from main imaging sensor 130A. This check may be done by partitioning the buffer of image data from main imaging sensor 130A into forty segments (e.g., approximately 100 columns each), and calculating the best focus index for each segment. If the difference in index for the leftmost and rightmost segments is less than a threshold (e.g., four), then the buffer pair is accepted as having minimal tilt, and is used for estimation of the parfocal location. The value of four for the threshold corresponds to a tilt of 0.5 microns/millimeter, which may be a system requirement for flatness.

Tilted focusing sensor 130B does not have a single best focus index (i.e., row Columns in the buffer of image data from focusing sensor 130B will have maximum contrast when the pixel 142 corresponding to that column is at best focus. The processing of the focus buffer proceeds with calculating the gradient of each row, and then finding the row index corresponding to the maximum value for each column. This data may be quite noisy, as illustrated in the example graph of low-pass filtered signal and fitting in FIG. 3. Thus, a median filter may be used, over a mean filter, to reduce the noise, due to the asymmetric nature of the noise. A linear fit is then constructed to the filtered index values, as illustrated by the fit line in FIG. 3. The column in which the linear fit crosses the maximum index value, from the image data acquired by the main imaging camera, is the parfocal point in the tilted focusing sensor 130B.

Figure 3:
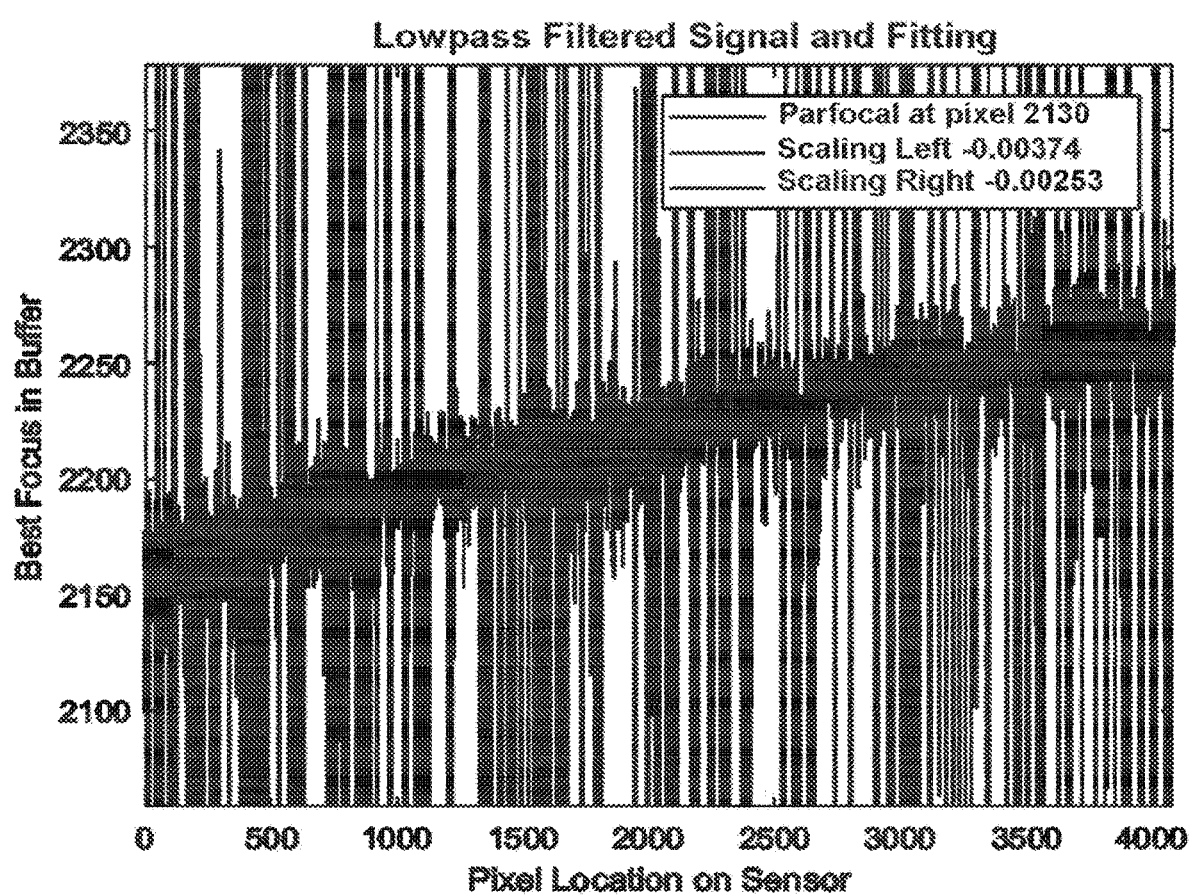
FIG. 3 illustrates an example graph of a low-pass filtered signal and fitting, according to an embodiment.

The slope of the linear fit corresponds to the change in Z-distance per pixel, and is needed for calculating the actual distance to move objective lens 120 to parfocality. However, the left side from the parfocal location is seen to have a greater slope than the right side. Thus, a linear fit is calculated separately for the data to the left of the parfocal location and the data to the right of the parfocal location, as illustrated in FIG. 3. These two slopes provide the left and right scaling factors in units of micron/pixel.

In an embodiment, the outputs of the parfocal calculation comprise a parfocal location, a left scaling factor, and a right scaling factor. The parfocal location is the location of the parfocal pixel 142 on tilted focusing sensor 130B. The left scaling factor is used to convert pixels 142, on the left side of the parfocal location, to microns. Similarly, the right scaling factor is used to convert pixels 142, on the right side of the parfocal location, to microns.

Figure 4:
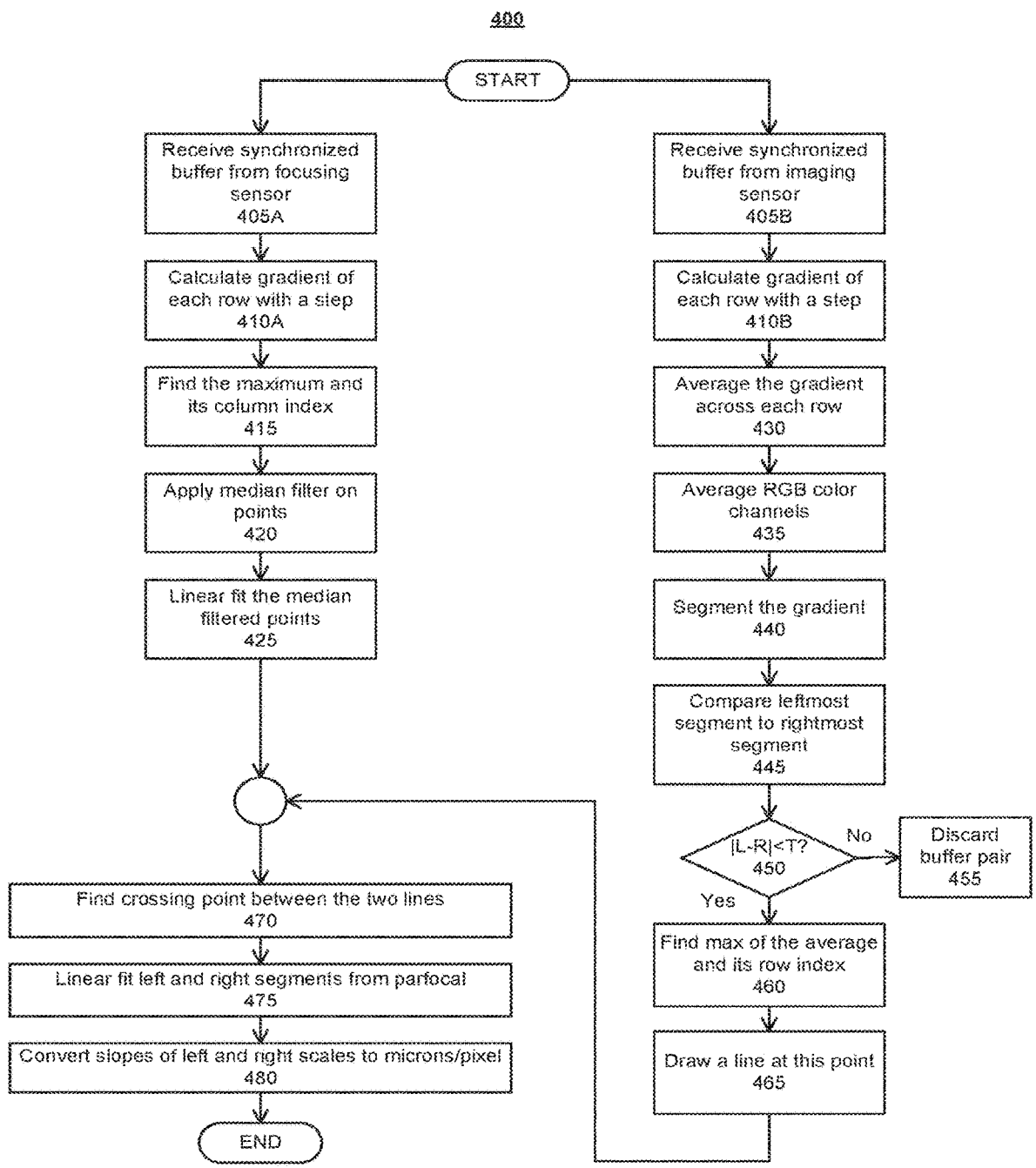
FIG. 4 illustrates a parfocal calculation, according to an embodiment.

FIG. 4 illustrates a parfocal calculation 400, according to an embodiment. Parfocal calculation 400 may be implemented in software instructions that are executed by processor(s) 104 of scanning system or by an external system. In steps 405A and 4059, the synchronized buffers are received from tilted focusing sensor 130B and main imaging sensor 130A, respectively. In an embodiment, each buffer comprises image data, acquired by its respective sensor, during scanning of a vertical Ronchi slide.

In steps 410A and 4109, the contrast gradient for each row in each buffer is calculated according to a predefined step. By default, the step for both buffers may be one row, such that no rows are skipped. Alternatively, the step may be greater than one row.

In step 415, the maximum of the contrast gradient is found for focusing sensor 130B, and the column index corresponding to that maximum is identified. Then, in step 420, a median filter (e.g., default=500) is applied on the points of the contrast gradient. In step 425, a linear fit is found for the median-filtered points. The line, representing this linear fit, is passed to step 470, assuming that a line is also found for the buffer of image data from main imaging sensor 130A in step 465.

In step 430, the contrast gradient, calculated from the buffer of main imaging sensor 130A in step 410B, is averaged across each roti. Then, in step 435, the R, G, and B color channels are averaged. In step 440, the contrast gradient is segmented. By default, the number of segments used in step 440 may be, for example, forty.

In step 445, the leftmost segment, from step 440, is compared to the rightmost segment from step 440. Specifically, the rightmost segment may be subtracted from the leftmost segment, or vice versa. If the absolute value of the difference is greater than or equal to a predetermined threshold T (i.e., "No" in step 450), the buffer pair, received in steps 405, may be discarded in step 455, and process 400 may be restarted using a new buffer pair. Otherwise, if the absolute value of the difference is less than the predetermined threshold T (i.e., "Yes" in step 450), process 400 proceeds to step 460. In an embodiment, the predetermined threshold T is equal to four.

In step 460, the maximum of the average, calculated in steps 430 and 435, is found, and the row index corresponding to that maximum is identified. Then, in step 465, a line is calculated at this point.

Once both a line has been found for the focusing sensor 130B in step 425 and a line has been found for the imaging sensor 130A in step 465, the intersection or crossing point between these two lines is found in step 470. This crossing point is the parfocal point. In addition, in step 475, a linear fit is found, independently, for both the left segment and the right segment from the parfocal point. Finally, in step 480, the slope of the left fit line is converted into a left scaling factor, and the slope of the right fit line is converted into a right scaling factor.

2.2.3. RIF Method Workflow

Figure 5A:
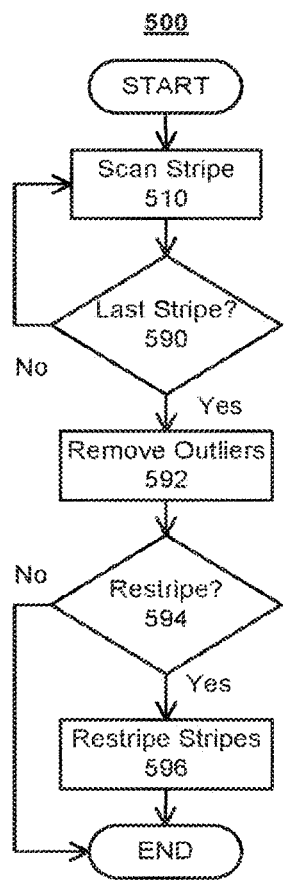
FIGS. 5A-5C illustrate a process for scanning an image of a sample on a glass slide, according to an embodiment.
Figure 5B:
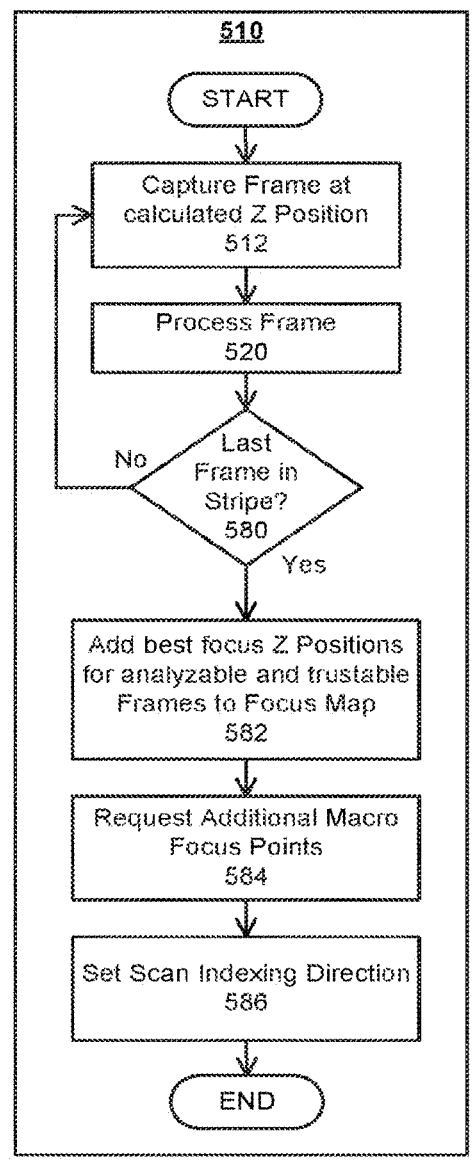
Figure 5C:
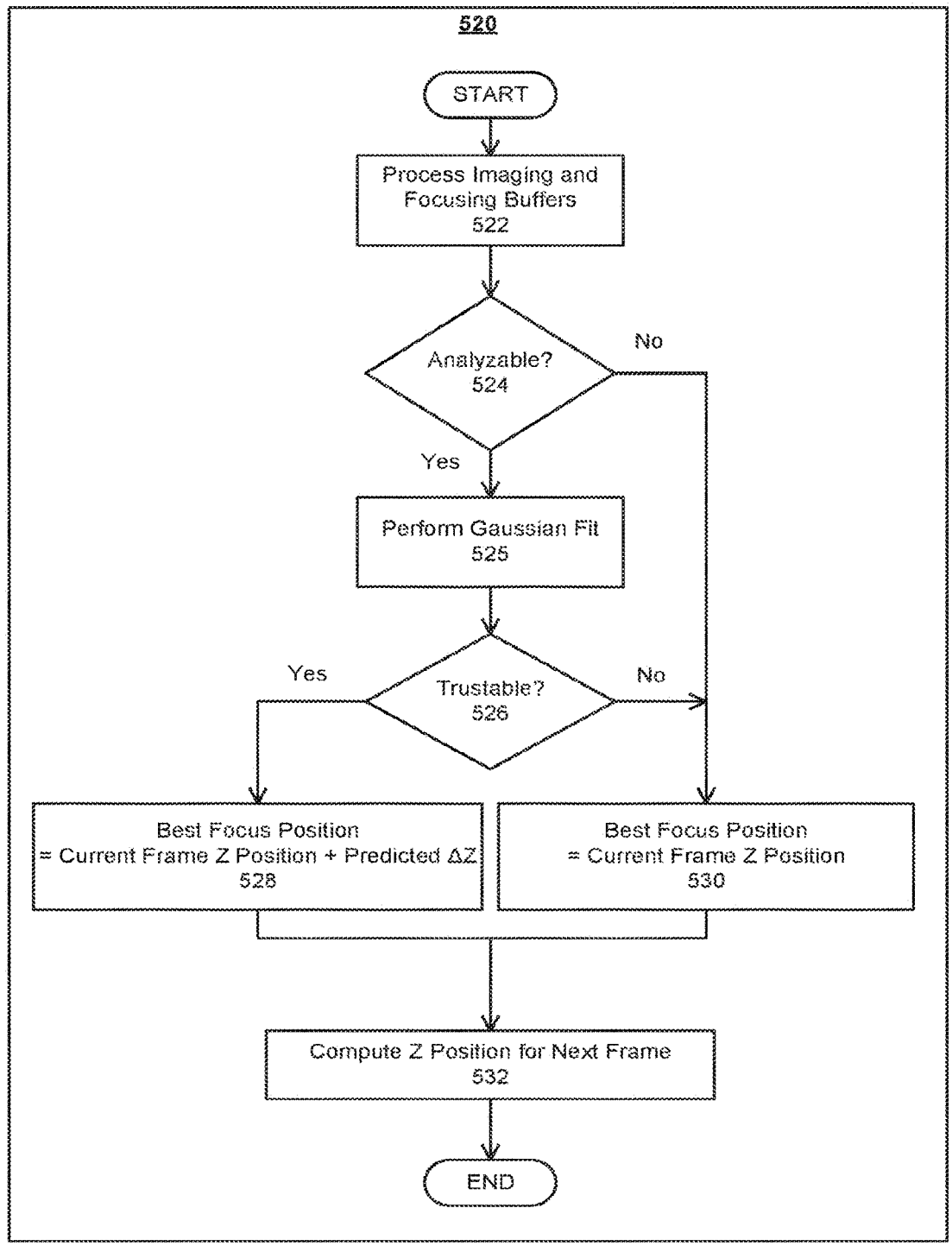

FIGS. 5A-5C illustrate a, process 500 for scanning an image of a sample 116 on a glass slide 114, according to an embodiment. Many of the illustrated steps are described in further detail elsewhere herein. It should be understood that process 500 may be implemented in software instructions that are executed by processor(s) 104 of scanning system 100.

Process 500 begins, in step 510, with the acquisition of an image stripe, representing image data, of a portion of sample 116. In step 590, it is determined whether or not the last image stripe has been acquired. If image stripes remain to be acquired (i.e., "No" in step 590), the next image stripe is acquired in another iteration of step 510. Otherwise, if no image stripes remain to be acquired (i.e., "Yes" in step 590), process 500 proceeds to step 592. Notably, image stripes may be acquired in any order. Advantageously, the ability to acquire image stripes in any order allows processor 104 of scanning system 100 to build the focus map more effectively using focus values, acquired by the WIT method, during scanning.

In step 592, outliers are removed as discussed in more detail elsewhere herein. In step 594, it is determined whether or not any image stripes need to be restriped, as discussed in more detail elsewhere herein. If no image stripes need to be restriped (i.e., "No" in step 594), process 500 ends with a complete set of image stripes of at least a portion of sample 116. Otherwise, if at least one image stripe needs to be restriped (i.e., "Yes" in step 594), those image stripe(s) are rescanned in step 596, and then process 500 ends with a complete set of image stripes of at least a portion of sample 116. Once the complete set of image stripes have been acquired, processor(s) 104 of scanning system 100 may align the image stripes and combine the image stripes into a full composite image of the entire scanned portion of sample 116. In addition, processor(s) 104 may compress the composite image using any known compression techniques.

An embodiment of step 510 is illustrated in greater detail in FIG. 5B. Specifically, in step 512, a frame of the image stripe is captured at a calculated Z position. Then, in step 520, the captured frame is processed to determine the Z position for the next frame. If frames remain to be acquired (i.e., "No" in step 580), the next frame is captured, in another iteration of step 512, at the Z position determined in step 520. Otherwise, if no frames remain to be acquired for the image stripe (i.e., "Yes" in step 580), process 500 proceeds to step 582.

In step 582, the Z positions with best focus for analyzable and trustable frames are added to the focus map. In step 584, additional macro focus points are requested. In step 586, the scan direction is set. That is, process 500 determines whether or not to move to the left side or right side of the current image stripe to capture the next image stripe.

An embodiment of step 520 is illustrated in greater detail in FIG. 5C. In step 522, the buffers of image data, each representing a frame, captured by both main imaging sensor 130A and tilted focusing sensor 130B, are processed to produce a max position for the buffer of tilted focusing sensor 130B, a mean gradient square for the buffer of main imaging sensor 130A, a total number of analyzable columns in the buffer of main imaging sensor 130A, a weight vector for main imaging sensor 130A, and a ratio vector (ratio at parfocal).

In step 524, it is determined whether or not the captured frame is analyzable. For example, as described elsewhere herein, the frame is determined to be analyzable when the frame has sufficient tissue to perform the Gaussian fitting process. If the frame is analyzable (i.e., "Yes" in step 524), process 500 proceeds to step 525. Otherwise, if the frame is not analyzable (i.e., "No" in step 524), process 500 proceeds to step 530.

In step 525, a Gaussian fit is performed. In step 526, it is determined whether or not the Gaussian fitting process is trustable (i.e., good fit) or not trustable (i.e., bad fit). If the Gaussian fitting result is trustable (i.e., "Yes" in step 526), process 500 provides the resulting predicted delta Z (i.e., predicted change in Z value to maintain focus) to step 528. Otherwise, if the Gaussian fitting result is not trustable (i.e., "No" in step 526), process 500 sets the frame to non-analyzable and untrustworthy, and proceeds to step 530.

In step 528, the best focus position is calculated as the sum of the Z position of the current frame and the predicted delta Z from the Gaussian fitting process in step 526. On the other hand, in step 530, the best focus position is simply set to the Z position of the current frame. In either case, in step 532, the Z position for the next frame is computed.

2.2.4. Ratio Method

Figure 6A:
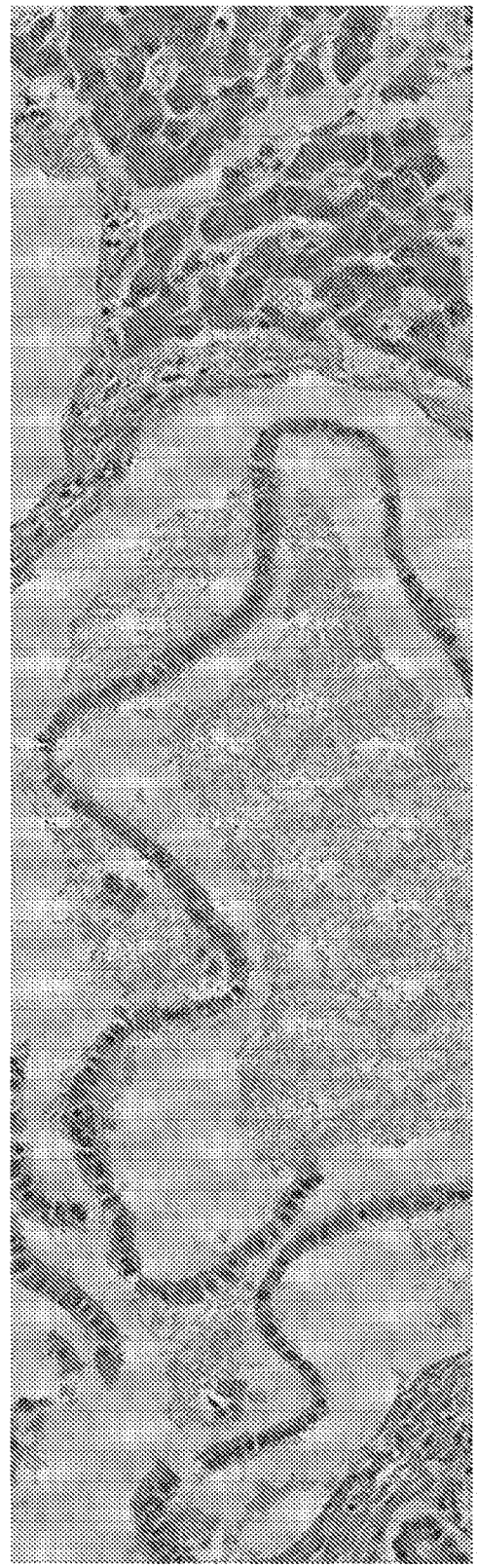
FIGS. 6A and 6B illustrate example frames of image data acquired by a main imaging sensor and tilted focusing sensor, respectively, according to an embodiment.
Figure 6B:

As discussed with respect to process 500, in an embodiment, image data from imaging and focusing sensors 130A and 130B are captured in frames. A single frame comprises two buffers: one corresponding to the data from main imaging sensor 130A; and the other corresponding to the data from tilted focusing sensor 130B. FIG. 6A illustrates an example buffer of image data acquired by main imaging sensor 130A, and FIG. 6B illustrates an example buffer of image data acquired by tilted focusing sensor 130B, according to an embodiment. In the illustrated embodiment, each frame consists of two buffers that are each 1,000 lines by 4,096 pixels wide.

Figure 7:
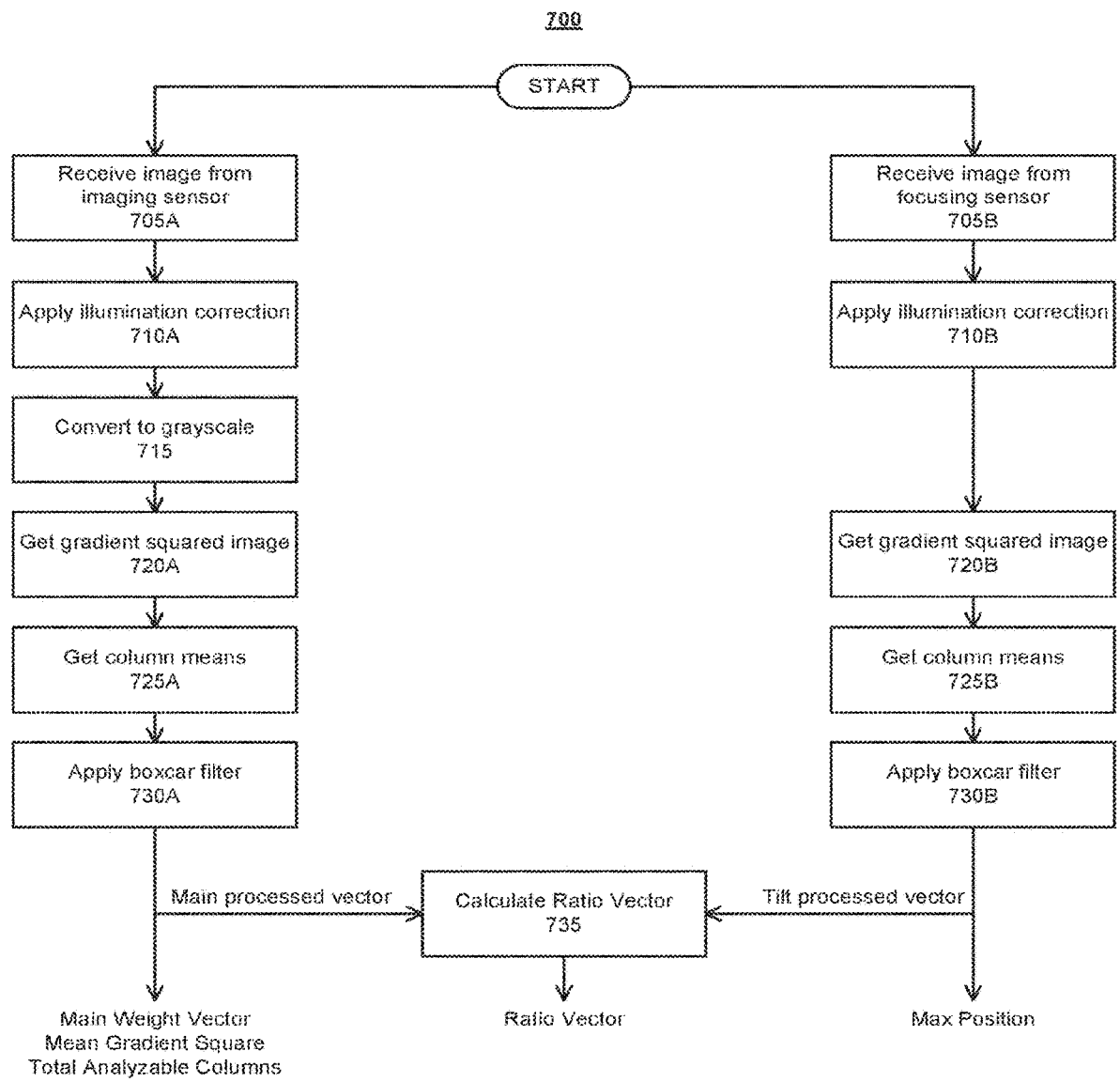
FIG. 7 illustrates a process for calculating a ratio vector, according to an embodiment.

FIG. 7 illustrates a process 700 for calculating the ratio vector, according to an embodiment. It should be understood that process 700 may be implemented in software instructions that are executed by a processor 104 of scanning system 100. In addition, process 700 may represent at least a portion of steps 522 and/or 524 in process 500.

In steps 705A and 705B, a frame of image data is received from main imaging sensor 130A and tilted focusing sensor 130B, respectively. Then, in steps 710, illumination correction is applied to the image pixels within each respective frame. For example, the illumination correction may utilize Photo Response Non Uniformity (PRNU) and/or Fixed Pattern Noise (FPN) techniques. In step 715, the RGB channels in the frame from main imaging sensor 130A are corrected separately, and then averaged with equal weighting into a grayscale frame.

In steps 720, a gradient-square operator is applied to each grayscale frame, i.e., the main imaging frame corrected in step 710A and converted in step 715, and the tilted focusing frame corrected in step 710B. A central difference in both horizontal dimensions may be used, with a difference spacing of eight pixels (138).

In steps 725, the gradient images are averaged along the columns. This converts each frame into a single vector. Then, in steps 730, a boxcar filter (e.g., one-hundred-one pixels) is applied to each vector to reduce the remaining noise. Finally, in step 735, the ratio vector is calculated by dividing the pixel values for the two vectors.

In an embodiment, process 700 is performed for every set of frames captured by imaging sensor 130A and focusing sensor 130B, including skipped frames. In this case, while only non-skipped frames will be analyzed for best focus position, it is still useful to know whether tissue is present in each frame.

In addition to the gradient vectors and ratio vector for each set of frames, the pixel location for the maximum in the tilt gradient vector and total number of analyzable columns in the main imaging gradient vector may also be calculated. The number of analyzable columns may be used (e.g., in step 524 of process 500) to determine if sufficient signal is present to allow for further analysis with the Gaussian fitting process.

FIG. 5A illustrates example gradient vectors for main imaging sensor 130A (the darker line graph starting and ending on the top) and tilted focusing sensor 130B (the lighter line graph starting and ending on the bottom), according to an embodiment. The structure in tilted focusing sensor 130B is irregular due to tissue variations across the frame. Thus, a single peak cannot be identified in the gradient vector for focusing sensor 130B.

Figure 8:
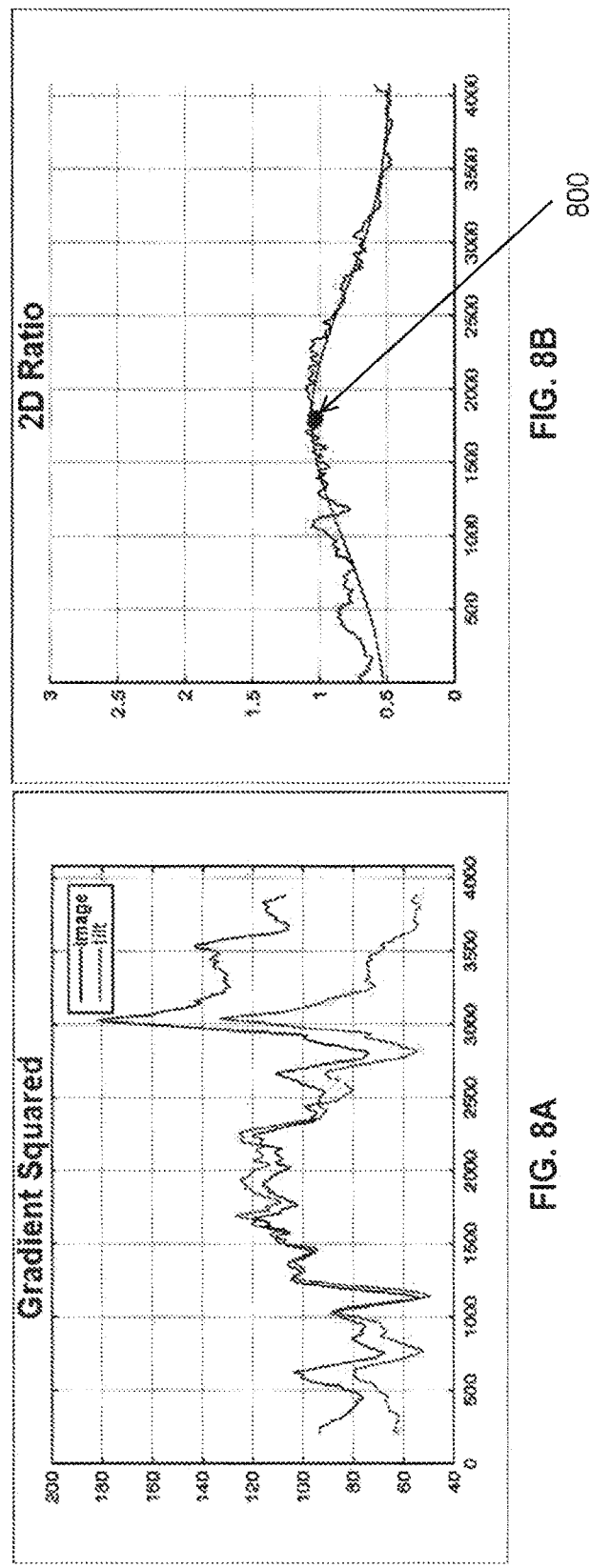
FIG. 8A illustrates example gradient vectors for a main imaging sensor and titled focusing sensor, according to an embodiment.
FIG. 8B illustrates an example ratio vector for two gradient vectors in FIG. 8A, according to an embodiment.

FIG. 8B illustrates the example ratio vector from the two gradient vectors in FIG. 8A, according to an embodiment.

Notably, the ratio vector is much smoother than either of the gradient vectors. As shown, a Gaussian function may be fitted to the ratio vector to allow the peak 800 to be accurately identified. Peak 800 in the Gaussian function represents the best focus position for this frame.

In an embodiment, the outputs from the ratio method, illustrated by process 700, which represent the inputs to the Gaussian fitting process, may comprise one or more of the following:

Main Gradient Vector. The main gradient vector is the average gradient signal for each column of the frame captured by main imaging sensor 130A.

Tilt Gradient Vector. The tilt gradient vector is the average gradient signal for each column of the frame captured by tilted focusing sensor 130B.

Ratio Vector. The ratio vector is the ratio for each column of the tilt gradient vector divided by the main gradient vector.

Ratio at Parfocal. The ratio at parfocal is the value of the ratio curve, represented by the ratio vector, at the parfocal location.

Ratio at Baseline. The ratio at baseline is the average value of the ratio curve, represented by the ratio vector, near the ends of the ratio vector.

Number of Analyzable Columns. The number of analyzable columns is the number of columns in the main gradient vector for which the main gradient vector exceeds a threshold MAIN_IMG_COLM_ANALYZABLE_THRESH=50).

Weight Vector. The main gradient vector is normalized to unit area and used as a weighting vector for Gaussian fitting. Columns (i.e., pixels) which have little tissue (i.e., a small gradient value) are given small importance in fitting a Gaussian function to the ratio, since these ratio values will be quite noisy. Larger gradient values have more signal, with correspondingly less noise in the ratio.

2.2.5. Gaussian Fitting

The Gaussian fitting process is represented as step 525 in process 500. The objective of the Gaussian fitting process is to fit a smooth Gaussian function to the ratio curve, and then determine the peak of the Gaussian function (e.g., peak 800 in FIG. 8B). This peak represents the calculated best focus position. In an embodiment, the Gaussian fitting process is only attempted if there is enough tissue present and the ratio curve has an allowable value at parfocal. For example, if the ratio at parfocal is between 0.5 and 1.5 and the number of analyzable columns exceeds 85% of total columns (e.g., "Yes" in step 524 in process 500), then the Gaussian fitting process is performed.

Fitting a Gaussian function to the ratio curve is a nonlinear problem. In an embodiment, the approach to solving this is to sample a set of possible Gaussian functions, and pick the Gaussian function with the smallest root-mean-square (RMS) difference from the ratio curve.

Figure 9:
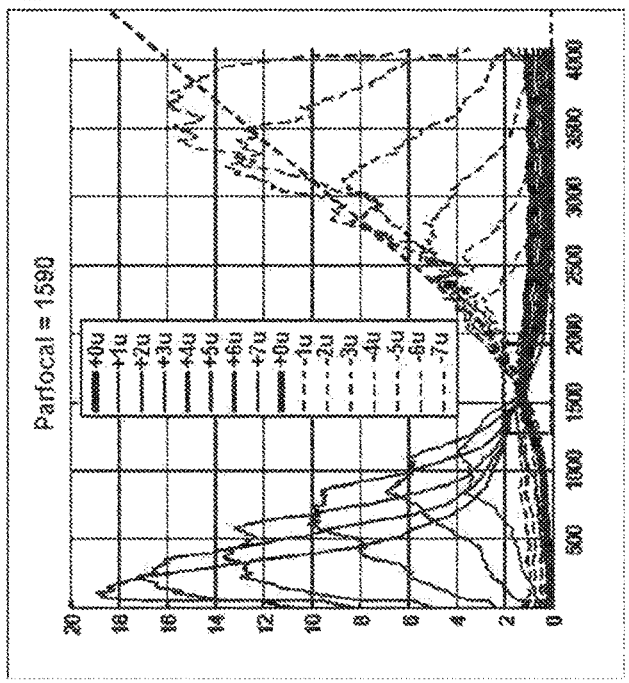
FIG. 9 illustrates ratio curves for a tissue sample, scanned at fixed offsets from parfocal, according to an embodiment.

Each sample Gaussian curve has four parameters: amplitude (peak); center (mean); width (sigma); and baseline (offset). The amplitude is parameterized as a function of distance from parfocal. FIG. 9 illustrates ratio curves for a tissue sample, scanned at fixed offsets from parfocal. In this example, parfocal is at column (i.e., pixel) 1590. Notably, the peaks increase as the offset from parfocal increases. The size of the peak is also tissue dependent. Thus, the rate of increase of the peak from parfocal may be estimated for each frame.

Figure 10:
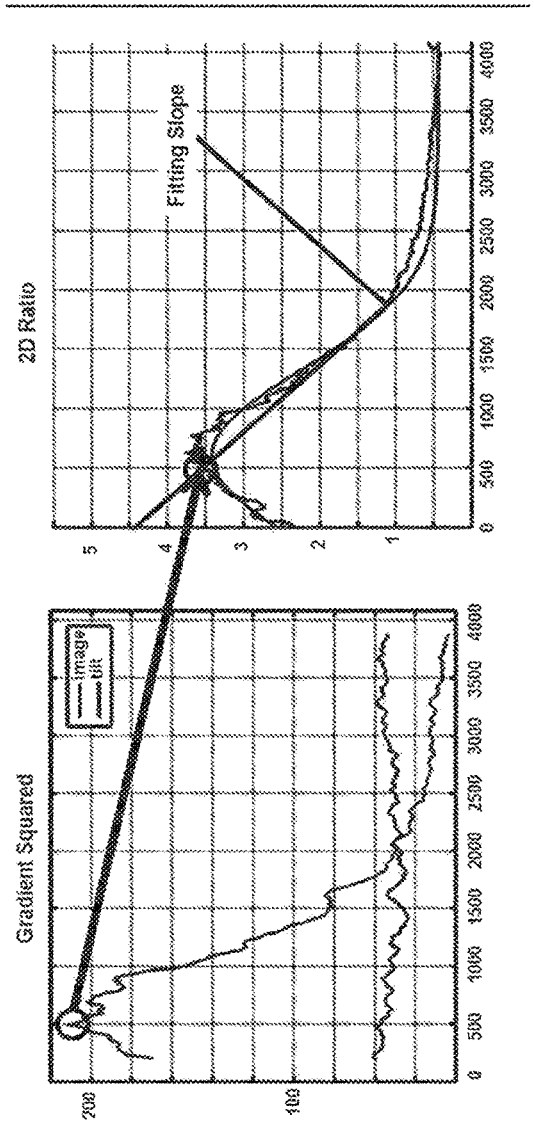
FIG. 10 illustrates examples in a Gaussian fitting process, according to art embodiment.

In an embodiment, to scale the Gaussian test functions, the position of the maximum for the tilted gradient vector is identified as shown on the leftmost graph in FIG. 10, The ratio vector value at this position and the distance of this position from parfocal may be used to define a fitting slope as shown on the rightmost graph in FIG. 10.

In an embodiment, the Gaussian test functions are scaled, such that the peak increases with distance from parfocal, with a rate equal to the fitting slope, One of these Gaussian test functions is illustrated on the rightmost graph in FIG. 10, as the smooth line that approximates the ratio curve. Notably, the best Gaussian function does not need to be centered at the peak location, taken from the ratio curve, since this peak is not necessarily centered but is only used for scaling. The ratio at baseline in the leftmost graph in FIG. 10 is approximately 3.5. This value is estimated from the end of the ratio curve and is used as an offset applied to the Gaussian test function in order to raise the Gaussian test function to the proper level.

Figure 11:
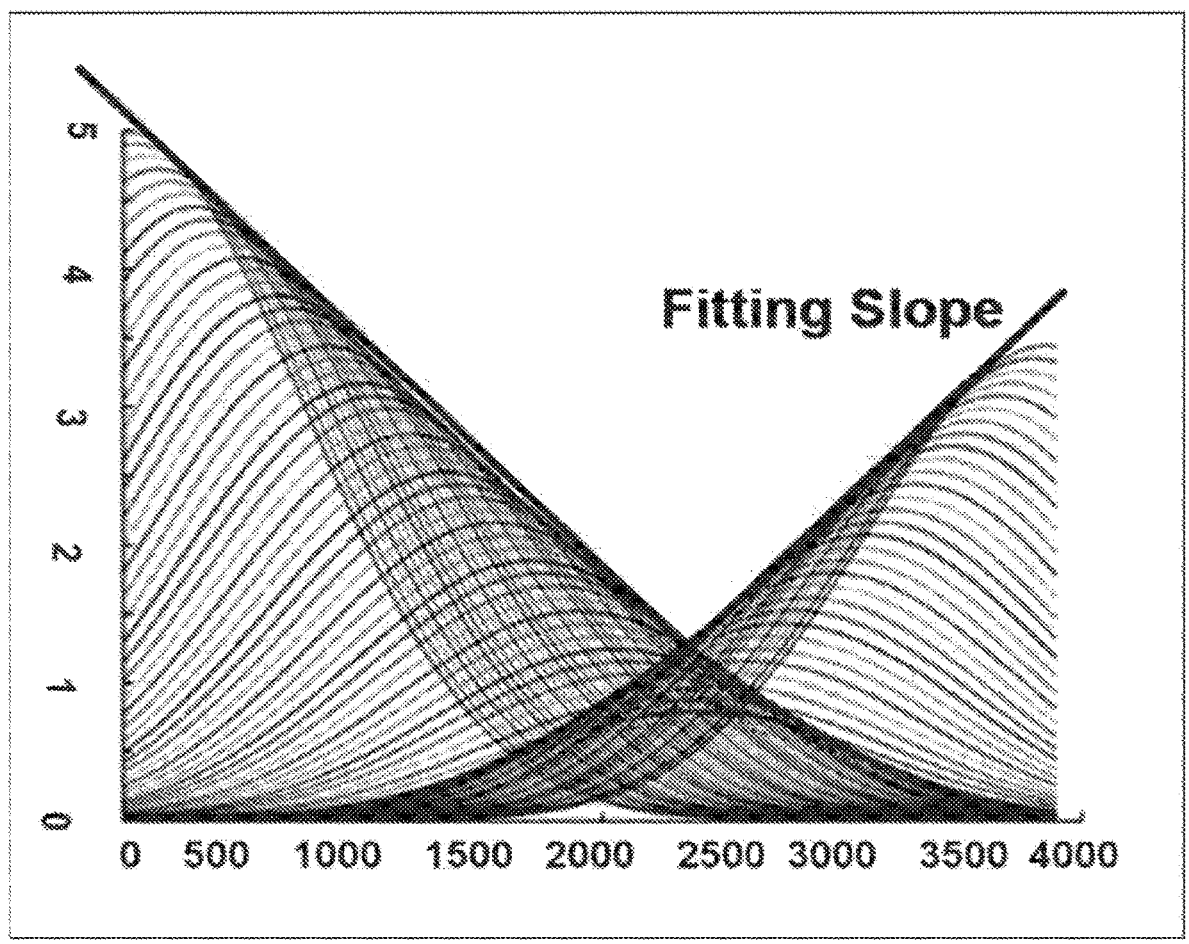
FIG. 11 illustrates a partial set of Gaussian test functions or different mean values and a fixed width; according to an embodiment.

In an embodiment, a set of means and sigmas are used to generate the Gaussian test functions. Mean values may range from 100 to 3,996 (i.e., 4,096-100), in increments of 25. Sigma values may range from 500 to 1,200, in increments of 100. FIG. 11 illustrates a partial set of Gaussian test functions for different mean values and a fixed width.

Figure 12:
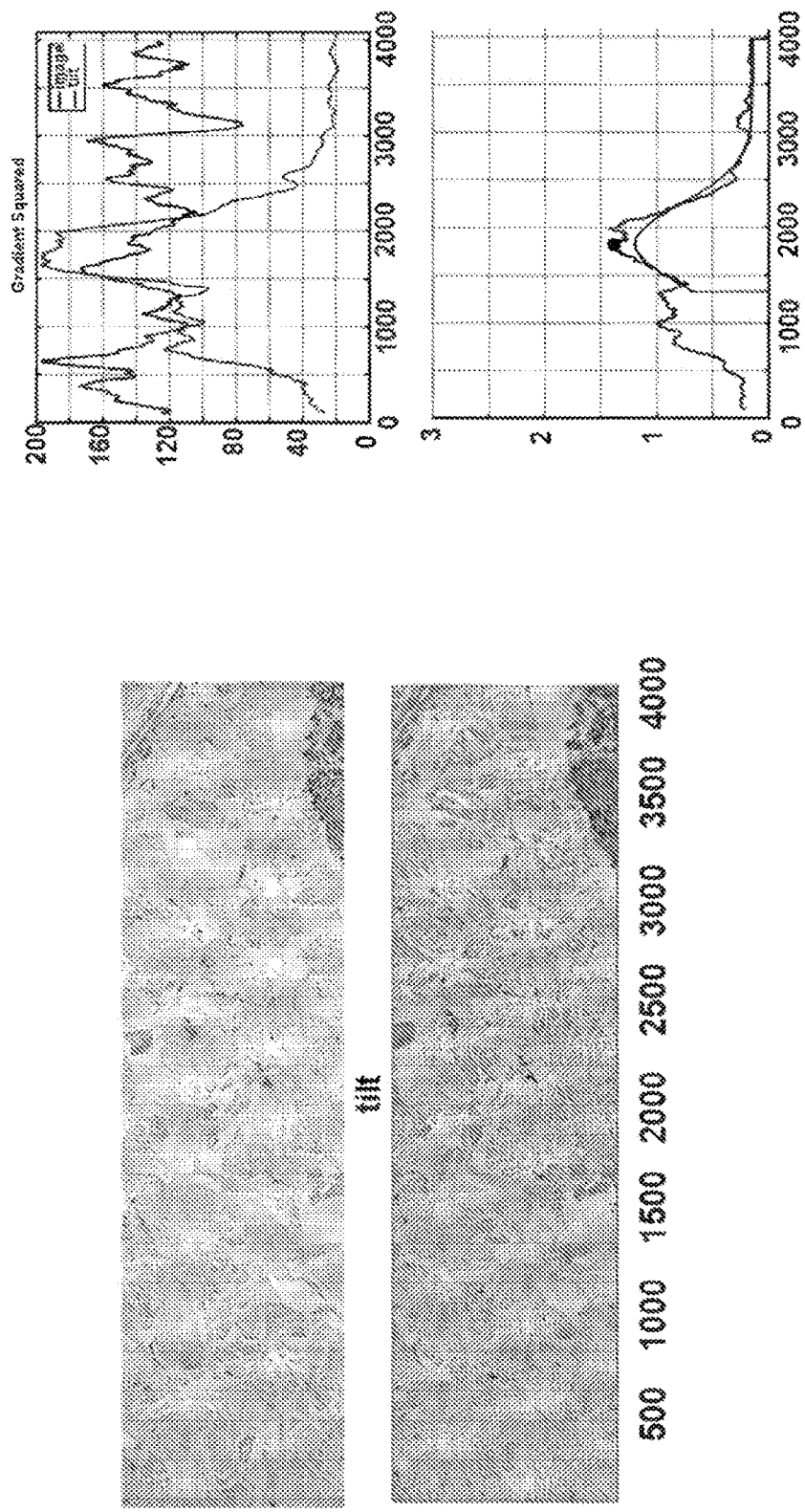
FIG. 12 illustrates examples in a Gaussian fitting process, in which the ratio curve has two peaks, according to an embodiment.

A second set of modified Gaussian functions (one-sided) are also added to this set. The reason for this is that the ratio curve sometimes does not have a single well-defined shape corresponding to a single peak. For example, the ratio curve can be wider with two peaks as shown in FIG. 12. Experience has shown that subjective image quality is best when the focus is taken on the rightmost peak. In the case shown in FIG. 12, this is also the largest and most prominent peak. The problem with a symmetric Gaussian function is that it will sometimes result in a broad peak, centered between the two peaks. In this case, neither set of features will be in focus, and the image will appear "soft" and out of focus across the entire frame. The rightmost peak represents a direction away from class slide 114, so that this set of Gaussian functions will prefer to focus on the upper features in the tissue section, when there are two possible focus depths.

Figure 13:
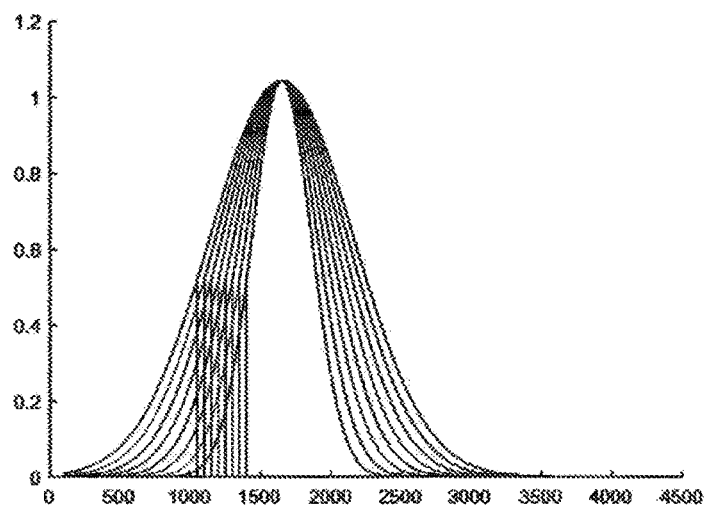
FIG. 13 illustrates example sets of Gaussian functions, according to an embodiment.
Figure 14:
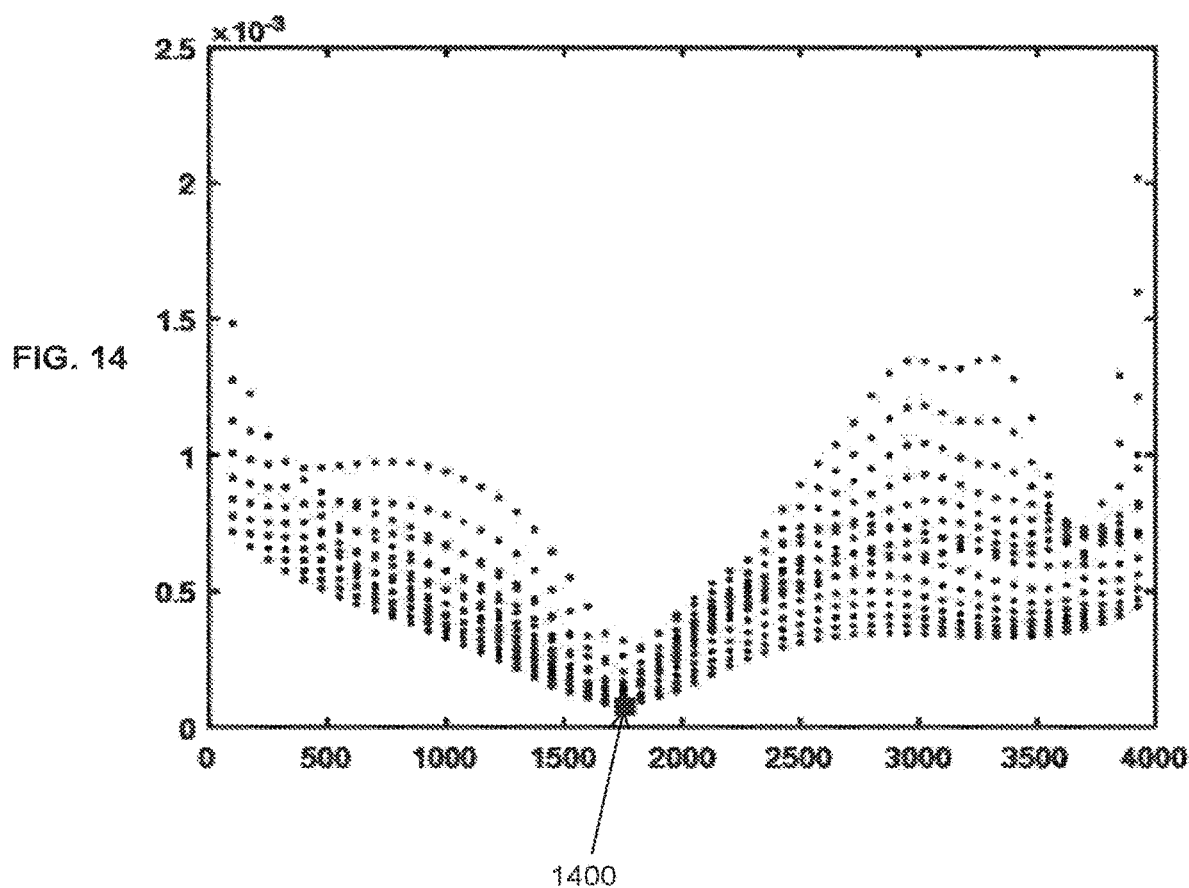
FIG. 14 illustrates an example minimum RMS difference value and location of a best-fit Gaussian function, according to an embodiment.

FIG. 13 shows the two sets of Gaussian functions—i.e., symmetric and one-sided—and the mean corresponding to the parfocal location. The full complement of Gaussian test functions that comprise the possible solutions are at the set of mean and sigma values stated above. Each of these Gaussian functions is normalized, as described above, for amplitude and baseline. Then, the RMS difference is calculated for each Gaussian test function against the ratio vector. The Gaussian function associated with the minimum RMS difference value is selected as the best fitting Gaussian function. Point. 1400 in FIG. 14 indicates the minimum RMS difference value and location of the best-fit Gaussian function.

In an embodiment, the Gaussian fitting process returns two numbers: best focus position; and fit maximum. The best focus position is the column (i.e., pixel) corresponding to the best focus. Focus error is proportional to the difference between this value and parfocal. The fit maximum is the amplitude of the ratio vector at the best focus position.

Figure 15:
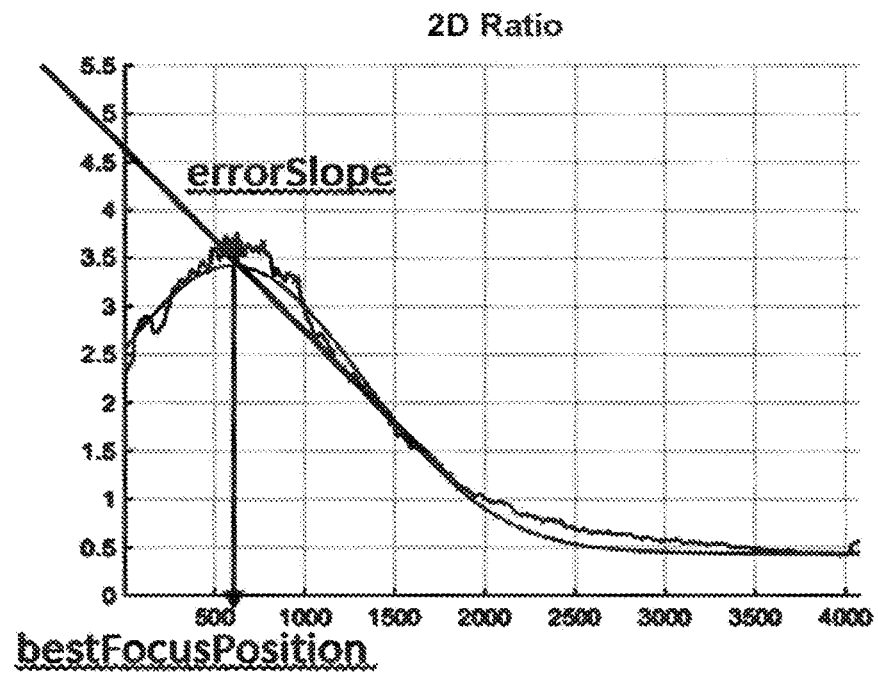
FIG. 15 illustrates an error slope calculation, according to an embodiment.

In an embodiment, the return values from the Gaussian fitting process are analyzed to determine whether or not they are trustable. Only trustable values are added to the focus map to be used for scanning subsequent image stripes. For instance, an error slope is calculated and compared to the fitting slope defined above for the Gaussian fitting. These two slopes should be comparable for the return values to be trusted. Otherwise, the return values should not be trusted. The error slope may be calculated as follows and illustrated in FIG. 15:

Error Slope=(Fit Max−Ratio at Parfocal)/(Best Focus Position−Parfocal)

There are two possible cases:

Case 1: the error slope and fitting slope have different signs (i.e., opposite sides of parfocal). In this case, the return values are trustable if the absolute value of (Fit Max—Ratio at Parfocal)/(Ratio at Parfocal)<0.20. The slopes are noisy near parfocal. Thus, they are not used to invalidate the Gaussian result.

Case 2: the error slope and fitting slope have the same sign (i.e., same side of parfocal). In this case, the return values are trustable if (Fitting Slope−Error Slope)/(Fitting Slope+Error Slope)<0.5. The difference in slopes is comparable to the average of the two slopes.

2.2.6. Frame Analyzable Score

In an embodiment, each frame of image data receives one of the following status scores (e.g., in step 524 of process 500):

NonAnalyzable (e.g., =−2): the frame has no tissue.

NonAnalyzableButHasTissue (e.g., =−4): the frame has tissue, but not enough for the Gaussian fitting process. In an embodiment, the frame has tissue if the average of all columns for the main gradient vector is greater than the value (e.g., 50) of the MAIN_IMG_COLM_A-NALYZABLE_THRESH parameter.

AnalyzableButUntrustable (e.g., =0 result of the Gaussian fitting process is not trustable.

AnalyzableButSkipped (e.g., =1): the frame has enough tissue for the Gaussian fining process but is a skipped frame.

AnalyzableAndTrustable (e.g., =2): The Gaussian fitting process returned a trustable result. The point is added to the focus map to be utilized for focusing when scanning subsequent image stripes.

MFPFrame (e.g., =3): The frame has a macro focus point. In an embodiment, frames which receive macro focus points, before scanning starts, will not receive RTE values, since only one focus value per frame is allowed.

2.2.7. Outlier Rejection

After all image stripes have been scanned, the focus map is complete. In an embodiment, at this point, the focus map is analyzed to determine if any of the points in the focus map (either RTF or MFP points) are outliers. This determination is represented as step 592 in process 500.

An outlier may be identified by considering the slope of the surface away from the sample point. The slope may be calculated in four directions on the surface, away from each sample point up, down, left, and right. If the minimum slope exceeds a threshold value, then that point may be designated as an outlier.

Figure 16:
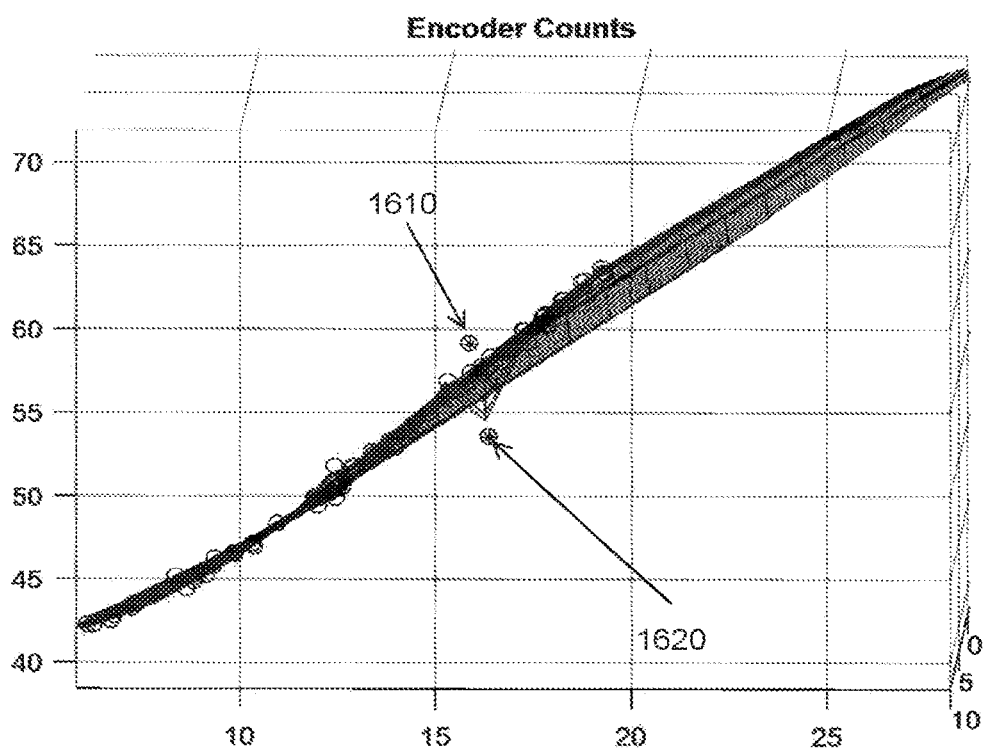
FIG. 16 illustrates an example of outlier detection, according to an embodiment.

An example is shown in FIG. 16, with a view looking sideways along the focal plane. Two points 1610 and 1620 have been identified as outliers. Therefore, these two points 1610 and 1620 will be removed from the focus map (e.g., in step 592 in process 500) before testing stripes for possible restriping (e.g., in step 594 of process 500).

2.2.8. Restriping

Figure 17A:
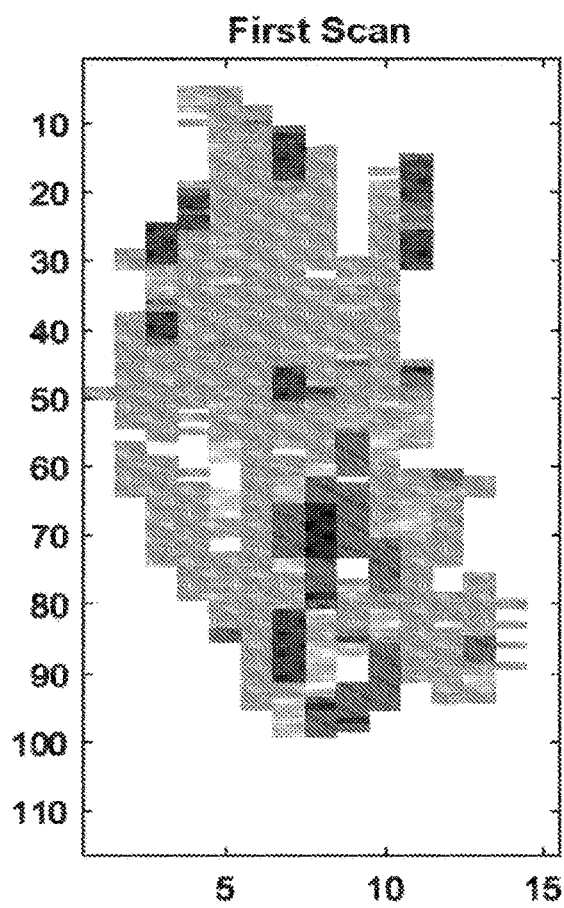
FIGS. 17A and 17B illustrate example heat maps representing focus errors, according to an embodiment.
Figure 17B:
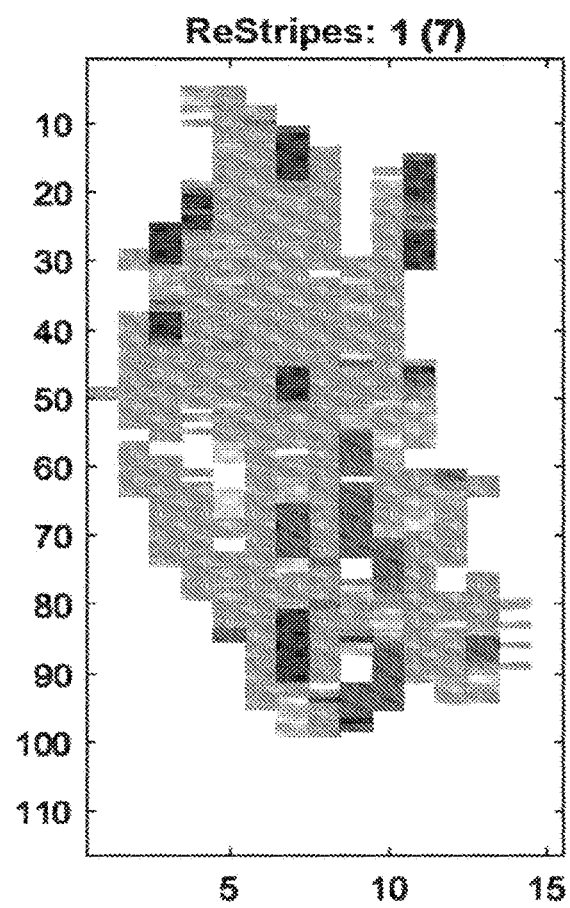

In an embodiment, the focus error for each frame, comprising tissue, is calculated by subtracting the actual position of objective lens 120 during scanning of the frame from the best focus position for that frame, as determined from the final focus map. This calculation (e.g., represented as step 594 in process 500) is performed after any potential outliers have been removed from the focus map (e.g., in step 592 in process 500). FIG. 17A illustrates the focus errors after all image stripes have been scanned in the first pass. Red and dark blue frames represent positive and negative errors, respectively, whereas green frames represent very small errors. Stripe Seven is shown to have a dark red area, and therefore, this image stripe may be selected for restriping. FIG. 17B illustrates the focus errors after Stripe Seven has been restriped. After restriping, Stripe Seven is mostly green, indicating that objective lens 120 is in substantial agreement with the focus map.

Skipped frames will generally have a small focus error after restriping, since objective lens 120 moves in steps for only the non-skipped frames. If large focus errors remain after restriping, this is indicative of large slopes along the scan axis, which generally indicates poor focus A final image quality assessment may be made from the heat-map (illustrated in an example if FIG. 17B) after restriping.

In an embodiment, the decision whether or not to restripe (e.g., in step 594 in process 500) is made for each image stripe based on the number and size of focus errors for that image stripe. For example, if 5% of the frames, in an image stripe, exceed a defined threshold (e.g., stored as the Focus_Quality_Restripe_Threshold parameter), then the image stripe will be restriped. This threshold may be a setting that can be adjusted to a level that is consistent with user preference. Naturally, the best image quality will be achieved if all image stripes are restriped. However, this would also double the scan time.

2.2.9. Image Quality Score

Image quality is a function, primarily, of focus accuracy, provided that the focus values have been measured on actual tissue and not artifacts (e.g., coverslip edges, bubbles, debris on top of the coverslip, etc.). Some tissues can also have large tilts, which makes it difficult to get the entire frame in focus. This can lead to poor image quality, but not much can be done to fix this problem.

In an embodiment, a binary image quality score is given to each scanned image: pass; or fail. "Fail" equates to very poor focus on a significant portion of slide 114. An image quality score of "fail" may be based on two metrics:

Percentage of Bad Frames. Failure is reported if the percentage of bad frames exceeds the Image_Quality_Bad_Frames_Threshold parameter. In an embodiment, the percentage of bad frames will generally be less than 5%, since individual image stripes are restriped when the percentage is higher than 5%.

Average Tilt. The average tilt is calculated from the focus map. Slides with tissue tilts less than 1 micron per millimeter can be expected to have good image quality. Failure may be reported if the tilt exceeds the Image_Quality_Tilt_Threshold parameter.

In an embodiment, images which receive a passing image quality score may still be judged unacceptable by an operator of scanning system 100. Improved quality can be achieved by reducing the Focus_Quality_Restripe_Threshold parameter, but this will result in more image stripes being rescanned in order to improve quality. Failed slides, as well as any slides that the operator judges to be of poor image quality, can be rescanned with the focusing method set to ReScan. The ReScan workflow adds additional MFP points at the start of the scan, as well as restriping all image stripes, which is naturally more time consuming.

2.2.10. RTF Parameters

In an embodiment, the RTF method utilizes a set of parameters, some of which may be adjusted to improve performance and accommodate a variety of samples 116 and/or glass slides 114. Many of these parameters may be configurable at run time from a configuration settings file (e.g., "scanner.xml" or other file, stored in memory 106), while other parameters may be fixed in the software. Examples of both types of parameters are identified and described below.

2.2.10.1. Fixed Parameters

Certain parameter values may be fixed in the software code. These parameter values may be determined based on the scanning of test slides and the desired algorithm performance. Illustrative, non-limiting examples of these fixed parameters are described below:

MAIN_IMG_COLM_ANALYZABLE_THRESH. An average main gradient vector value greater than this threshold indicates the presence of tissue. An example value of this parameter is fifty. In an embodiment, 85% of columns in the main gradient vector must exceed this value to proceed to the Gaussian fitting process.

Parfocal Threshold. In an embodiment, a frame can proceed to the Gaussian fitting process if the ratio at parfocal is greater than 0.5 and less than 1.5 (i.e., 0.5<ratio at parfocal<1.5).

Sample Values for the Gaussian Fitting. These are the center points (mean) and widths (sigma) to test as candidates for the best-fitting Gaussian function. In an embodiment, mean values range from 100 to 3,996 (4,096-100) in increments of 25, and sigma values range from 500 to 1,200 in increments of 100.

2.2.10.2. Configurable Parameters

Configurable parameter values may be stored in an XML file (e.g., "scanner.xml" or other file, stored in memory 106) that is used to hold the various parameters needed to configure scanning system 100 for operation. Illustrative, non-limiting examples of these configurable parameters are described below with nominal values:

Focusing Method. This parameter may be set to one of the following values:

RTF: This is the default method. If the RTF method is set as the focusing method, a certain number (e.g., three) of macro focus points are used to begin scanning, and then the RTF method and additional macro focus point values are used to create the focus map during scanning. A probable tissue map from a tissue-finding algorithm may be used to identify allowable frames for focus points. In addition, outlier focus point values are identified and removed, and restriping is performed for image stripes which exceed the restriping threshold.

PointFocus: If the MFP method is set as the focusing method, only macro focus points are used to populate the focus map. These points are evaluated before image stripes are acquired, so no restriping is performed.

ReScan: This method is time consuming, but is intended to provide good image quality for slides 114 which fail the default RTF method. The entire available scan area is scanned. Thus, a tissue-finding algorithm is not used to constrain the location of focus points during the scan. The scan begins with the full complement of macro focus points (equivalent to PointFocus), and all image stripes are restriped.

Parfocal. The value of this parameter is the pixel location on tilted focusing sensor 130B that corresponds to parfocality with main imaging sensor 130A. By default, the value of this parameter may be set to 1766.

Stage_Tilt_Scan. This may be a parameter that is available for future use, and arias, have a default value of 0.0.

Stage_Tilt_Index. This may be a parameter that is available for future use, and may have a default value greater than or equal to 0.0.

Image_Data_Number_Rows. The value of this parameter is the number of rows that comprise a single frame. By default, the value of this parameter may be set to 1000.

Image_Data_Number_Columns. The value of this parameter is the number of columns that comprise a single frame, and must be less than or equal to the number of pixels 142 in line scan cameras 130. By default, the value of this parameter may be set to 4096.

Image_Data_Number_Color_Channels. The value of this parameter is the number of color channels. For RGB data, the value of this parameter will always be three, representing the three red, green, and blue color channels. Thus, by default, the value of this parameter may be set to 3.

Z_Offset. The value of this parameter is the offset for focus values when scanning in X/Y methods (i.e., both the MFP and RTF methods). It may be adjusted experimentally by scanning a tissue sample 116 on a slide 114 with a series of values, to see which value provides the sharpest image. Alternatively, a test script can be used to scan a small area (e.g., 1 mm×1 mm) with a sequence of offset values, and an average contrast can be calculated for each offset value in the sequence. The offset value with the maximum contrast corresponds to the optimal value for this parameter. By design, this offset value should be zero. However, it has been found that there can be a systematic error in Z position when stage 112 is moving, as compared to when stage 112 is stationary. By default, the value of this parameter may be set to 0.0005 millimeters.

Z_Scaling_Factor_Left. The value of this parameter is the scaling factor, multiplied by 0.01, as units of microns per pixel. The scaling factor has units of encoder counts for objective lens 120) per pixel for the case of 100 counts per micron. This parameter is used to convert pixels to microns along tilted focusing sensor 130B, and applies to Z distance in the downward direction (i.e., towards glass slide 114). By default, the value of this parameter may be set to 0.38832.

Z_Scaline_Factor_Right. The value of this parameter is the scaling factor, multiplied by 0.01, as units of microns per pixel. The scaling factor has units of encoder counts (for objective lens 120) per pixel for the case of 100 counts per micron. This parameter is used to convert pixels to microns along tilted focusing sensor 130B, and applies to 7 distance in the upward direction (i.e., away from glass slide 114). By default, the value of this parameter may be set to 0.31943.

Issue_Move_Every_X_Frames_Modulo. The scanning workflow involves moving objective lens 120 only on certain frames, Frames, for which no movement of objective lens 120 occurs, are analyzed with the RTF method. By default, the value of this parameter may be set to 2, which means that every other frame will be skipped.

Frame_Lag_Stripe_Abort_Threshold. The value of this parameter is the number of frames for which RTF processing is permitted to lag the position of objective lens 120. A large value effectively disables this feature. If the frame lag exceeds the value of this parameter, scanning of the image stripe will be aborted, and a rescan of the image stipe will be initiated. By default, the value of this parameter may be set to 300.

Debugging. The value of this parameter is a Boolean. By default, the value of this parameter may be set to false. If the value of this parameter is set to true, actual frame image data will be output.

Debug_Frame_Number. The value of this parameter is the number of the frame to output if the Debugging parameter is set to true. By default, the value of this parameter may be set to 1.

Debug_Stripe_Number. The value of this parameter is the number of the image stripe to output if the Debugging parameter is set to true. Only a single frame may be output in order to avoid the interference to subsequent RTF processing, as well as changes to data from normal operation, that would be caused by writing information to memory. By default, the value of this parameter may be set to 3.

Focus_Quality_Restripe_Threshold. The value of this parameter is a number of encoder counts. If a certain percentage e.g., 5%) of the frames with tissue, in an image stripe, have a focus error that exceeds this value, the image stripe will be restriped. Focus error may be calculated by comparing the actual Z position of objective lens 120 to the final focus map. Setting this parameter to a high value will effectively disable restriping, whereas setting this parameter to a low value will cause all image stripes with tissue to be rescanned. By default, the value of this parameter may be set to 90.

Do_Restripe. The value of this parameter is a. Boolean. If the value of this parameter is true, then restriping is enabled. Otherwise, if the value of this parameter is false, then restriping is disabled, such that no restriping is performed (e.g., steps 594 and 596 in process 500 are skipped). In addition, if the value of this parameter is false, other associated functions (e.g., outlier rejection in step 592 in process 500) may also be skipped. By default, the value of this parameter may be set to true.

Do_Outlier_Rejection. The value of this parameter is a Boolean. If the value of this parameter is true, then the focus map is analyzed for outliers (e.g., in step 592 in process 500). Any detected outliers are discarded, and the focus map is recalculated without the discarded outliers. This is done prior to the determination of whether or not to perform restriping (e.g., in step 594 in process 500). If the value of this parameter is false, then the focus map is not analyzed for outliers and no outlier rejection is performed (e.g., step 592 in process 500 is skipped default, the value of this parameter may be set to true.

Outlier_Rejection_Threshold. The value of this parameter is in units of microns per millimeter. In an embodiment of step 592 in process 500, for each point in the focus map, the four slopes are calculated along the surface for up, down, right, and left. If the minimum slope is greater than the value of this parameter, the point is marked as an outlier and will not be subsequently used in the focus map. The idea is that an outlying point will have large slopes in all directions away from that point. By default, the value of this parameter may be set to 2.0.

Focus_On_Probable_Tissue. The value of this parameter is a Boolean. If the value of this parameter is true, the probable tissue map from a tissue-finding algorithm is used as a mask for allowable focus locations in the RTF method. The RTF method is very sensitive to detecting frames with tissue, which can result in focus values being added to the focus map even though they are not truly on tissue. Using the probable tissue mask prevents this. If the value of this parameter is false, the probably tissue map is not used as a mask. By default, the value of this parameter may be set to true.

Request_Additional_NWPs. The value of this parameter is a Boolean. If the value of this parameter is true, additional macro focus points may be requested (e.g., in step 584 of process 500) after each image stripe is scanned. These extra macro focus points are used to provide extra focus values to the focus map in cases in which the RTF method is not able to reliably focus. If the value of this parameter is false, additional macro focus points will not be requested after each image stripe is scanned. By default, the value of this parameter may be set to true.

Focus_Point_R_Min. The value of this parameter is in units of millimeters. If the value of the Request Additional MVPs parameter is true and a frame with tissue is more distant from a valid focus value than the value of this Focus_Point_R_Min parameter, then a macro focus point is requested for the center of the frame (e.g., in step 584 of process 500). These extra macro focus points will be focused and added to the focus map prior to scanning the next image stripe. By default, the value of this parameter may be set to 2.

Enable_PredictedZ_Offset. The value of this parameter is a Boolean. If the value of this parameter is true, the predicted values from the focus map are subtracted from the best focus value calculated by the RTF method. The resulting difference is added to the focus value in the focus map that is predicted for the next frame. This functionality is intended to improve focus accuracy, by removing a trend in the focus error, and reduce the restriping rate. If the value of this parameter is false, this functionality is disabled. By default, the value of this parameter may be set to true.

Image_Quality_Bad_Frames_Threshold. The value of this parameter is a percentage. If the percentage of bad frames exceeds the value of this parameter, then the image quality score is set to "fail," By default, the value of this parameter may be set to 10%.

Image_Quality_Tilt_Threshold. The value of this parameter is in units of microns per millimeter. If the average tilt for the tissue exceeds the value of this parameter, then the image quality score is set to "fail." By default, the value of this parameter may be set to 5 microns/mm.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor of a scanning system to:
   initialize a focus map;
   add focus points to the focus map while acquiring a plurality of image stripes of at least a portion of a sample on a glass slide, by, for each of the plurality of image stripes:
      acquiring each of a plurality of frames, collectively representing the image stripe, using both an imaging sensor and a focusing sensor, and
      adding focus points, representing positions of best focus for trusted ones of the plurality of frames, to the focus map;
   remove any outlying focus points from the focus map;
   determine whether or not to rescan one or more of the acquired plurality of image stripes based on a focus error for each of the plurality of frames in the plurality of image stripes;
   reacquire, for each image stripe from the plurality of image stripes determined to be rescanned, each of the plurality of frames that collectively represent the image stripe, wherein the reacquired plurality of frames replaces the previously acquired plurality of frames for the image stripe; and
   assemble the plurality of image stripes into a composite image of the at least a portion of the sample.

2. The method of claim 1, wherein adding focus points to the focus map while acquiring the plurality of image stripes further comprises, for each of the plurality of image stripes other than a last one of the plurality of image stripes to be acquired, after acquiring the image stripe, determining a direction from the image stripe of a next one of the image stripes to acquire.

3. The method of claim 2, wherein the plurality of image stripes are acquired by, in order:
   acquiring a reference stripe;
   acquiring image stripes, in sequence, from a first side of the reference stripe to a first edge of a scan area of the sample; and
   acquiring image stripes, in sequence, from a second side of the reference stripe, which is opposite the first side of the reference stripe, to a second edge of the scan area, which is opposite the first edge of the scan area.

4. The method of claim 1, further comprising, prior to starting acquisition of the plurality of image stripes, adding a plurality of macro focus points to the focus map.

5. The method of claim 1, further comprising, after acquisition of one or more of the plurality of image stripes, adding one or more macro focus points to the focus map.

6. The method of claim 1, wherein adding focus points to the focus map while acquiring the plurality of image stripes further comprises, for each of the plurality of frames in each of the plurality of image stripes, determining whether or not the frame is trusted.

7. The method of claim 6, wherein determining whether or not the frame is trusted comprises:
   calculating a main gradient vector comprising an average gradient vector for each column in the frame acquired by the imaging sensor,
   calculating a tilt gradient vector comprising an average gradient vector for each column in the frame acquired by the focusing sensor;
   determining a number of analyzable columns in the main gradient vector;
   calculating a ratio vector based on the main gradient vector and the tilt gradient vector;
   determining whether or not the frame is analyzable based on the number of analyzable columns and the ratio vector;
   when determining that the frame is not analyzable, determining that the frame is not trusted; and,
   when determining that the frame is analyzable,
      fitting at least one Gaussian function to a ratio curve, represented by the ratio vector,
      identifying a peak of the Gaussian function as a best focus position,
      identifying an amplitude of the ratio vector at the best focus position as a fit maximum,
      determining whether or not the frame is trustable based on the best focus position and the fit maximum,
      when determining that the frame is not trustable, determining that the frame is not trusted, and,
      when determining that the frame is trustable, adding the best focus position to the focus map.

8. The method of claim 7, wherein determining the number of analyzable columns comprises determining a number of columns in the main gradient vector that exceed a threshold.

9. The method of claim 7, wherein calculating the ratio vector comprises dividing the tilt gradient vector by the main gradient vector.

10. The method of claim 7, wherein determining whether or not the frame is analyzable comprises:
    determining whether or not the number of analyzable columns exceeds a predefined threshold percentage;
    determining whether or not a value of the ratio vector at a parfocal location is within a predefined range, wherein the parfocal location is a point on the focusing sensor that is parfocal with the imaging sensor,
    when determining that the number of analyzable columns does not exceed the predefined threshold or the value of the ratio vector at the parfocal location is not within the predefined range, determining that the frame is not analyzable, and,
    when determining that the number of analyzable columns exceeds the predefined threshold percentage and the value of the ratio vector at the parfocal location is within the predefined range, determining that the frame is analyzable.

11. The method of claim 7, wherein fitting at least one Gaussian function to the ratio curve comprises:
    sampling a plurality of possible Gaussian functions within a range of mean values and a range of sigma values; and
    selecting one of the plurality of possible Gaussian functions, to be used for identifying the best focus position, with a smallest difference from the ratio curve.

12. The method of claim 1 wherein determining whether or not to rescan one or more of the plurality of image stripes comprises, after removing any outlying focus points from the focus map:
    for each of the plurality of frames in each of the plurality of image stripes, calculating the focus error for the frame by subtracting an actual position of an objective lens during acquisition of the frame from a best focus position for that frame within the focus map;

for each of the plurality of image stripes, determining to rescan the image stripe when a number of the frames, that have a focus error exceeding a predefined threshold, exceeds a predefined threshold percentage.

13. A scanning system comprising:

an imaging sensor;

a focusing sensor;

at least one hardware processor; and one or more software modules configured to, when executed by the at least one hardware processor, initialize a focus map, add focus points to the focus map while acquiring a plurality of image stripes of at least a portion of a sample on a glass slide, by, for each of the plurality of image stripes:

acquiring each of a plurality of frames, collectively representing the image stripe, using both the imaging sensor and the focusing sensor, and adding focus points, representing positions of best focus for trusted ones of the plurality of frames, to the focus map, remove any outlying focus points from the focus map, determine whether or not to rescan one or more of the acquired plurality of image stripes based on a focus error for each of the plurality of frames in the plurality of image stripes, reacquire, for each image stripe from the plurality of image stripes determined to be rescanned, each of the plurality of frames that collectively represent the image stripe, wherein the reacquired plurality of frames replaces the previously acquired plurality of frames for the image stripe, and assemble the plurality of image stripes into a composite image of the at least a portion of the sample.

14. A non-transitory computer-readable storage medium having instructions stored thereon, wherein the instructions, when executed by a processor of a scanning system, cause the processor to:

initialize a focus map;

add focus points to the focus map while acquiring a plurality of image stripes of at least a portion of a sample on a glass slide, by, for each of the plurality of image stripes:

acquiring each of a plurality of frames, collectively representing the image stripe, using both an imaging sensor and a focusing sensor, and adding focus points, representing positions of best focus for trusted ones of the plurality of frames, to the focus map;

remove any outlying focus points from the focus map;

determine whether or not to rescan one or more of the plurality of image stripes based on a focus error for each of the plurality of frames in the plurality of image stripes;

reacquire, for each of the plurality of image stripes determined to be rescanned, each of the plurality of frames, collectively representing the image stripe, using both the imaging sensor and the focusing sensor; and assemble the plurality of image stripes into a composite image of the at least a portion of the sample.

* * * * *